(12) United States Patent
Higuchi et al.

(10) Patent No.: US 10,650,815 B2
(45) Date of Patent: May 12, 2020

(54) VOICE INTERACTION DEVICE, VOICE INTERACTION METHOD, VOICE INTERACTION PROGRAM, AND ROBOT

(71) Applicant: Panasonic Intellectual Property Management Co., Ltd., Osaka (JP)

(72) Inventors: Seiya Higuchi, Osaka (JP); Yuji Kunitake, Kyoto (JP); Yusaku Ota, Osaka (JP); Ryouta Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 65 days.

(21) Appl. No.: 15/834,030

(22) Filed: Dec. 6, 2017

(65) Prior Publication Data

US 2018/0166076 A1    Jun. 14, 2018

(30) Foreign Application Priority Data

Dec. 14, 2016    (JP) ................................. 2016-242180

(51) Int. Cl.
*G10L 15/22* (2006.01)
*G06F 17/27* (2006.01)
(Continued)

(52) U.S. Cl.
CPC ........... *G10L 15/22* (2013.01); *B25J 11/0005* (2013.01); *B25J 13/003* (2013.01); *G06F 3/167* (2013.01);
(Continued)

(58) Field of Classification Search
USPC ...................................................... 704/9, 235
See application file for complete search history.

(56) References Cited

U.S. PATENT DOCUMENTS 8,447,863 B1 *   5/2013  Francis, Jr. ........... H04W 4/029
                                                       709/226
9,621,713 B1 *   4/2017  Gainsboro .......... H04M 3/2281
(Continued)

FOREIGN PATENT DOCUMENTS

JP     2010-160608    7/2010
JP     2013-073355    4/2013
JP     2016-006607    1/2016

OTHER PUBLICATIONS

Matsuyama, Yoichi, et al. "Four-participant group conversation: A facilitation robot controlling engagement density as the fourth participant." Computer Speech & Language 33.1 (2015): 1-24. (Year: 2015).*

(Continued)

*Primary Examiner* — Seong-Ah A Shin
(74) *Attorney, Agent, or Firm* — Greenblum & Bernstein, P.L.C.

(57) ABSTRACT

A topic providing device includes a candidate topic extractor, a provided topic determiner, a voice synthesizer, and a speaker. When a determination is made that a parent and child are conversing and that there is a need to provide a new topic to the parent and child, based on a conversation history database and a child activity database storing at least one activity name indicating an activity the child was engaged in for a first predetermined period of time, the candidate topic extractor extracts at least one candidate topic that corresponds to the at least one activity name in the child activity database and does not correspond to an activity name included in text data recorded in a first database. From the at least one candidate topic, the provided topic determiner selects one topic to provide to the parent and the child. The voice synthesizer generates voice data containing the one topic. The speaker outputs the voice data.

13 Claims, 16 Drawing Sheets

(51) Int. Cl.
    *G10L 15/18* (2013.01)
    *G10L 15/24* (2013.01)
    *G10L 13/04* (2013.01)
    *G10L 25/48* (2013.01)
    *G06K 9/00* (2006.01)
    *B25J 13/00* (2006.01)
    *G10L 15/26* (2006.01)
    *G06K 9/62* (2006.01)
    *B25J 11/00* (2006.01)
    *G06F 16/00* (2019.01)
    *G06F 16/332* (2019.01)
    *G06F 3/16* (2006.01)
    *G10L 15/08* (2006.01)
    *B25J 9/00* (2006.01)
    *G10L 25/21* (2013.01)

(52) U.S. Cl.
    CPC .......... *G06F 16/00* (2019.01); *G06F 16/3329* (2019.01); *G06K 9/00281* (2013.01); *G06K 9/00288* (2013.01); *G06K 9/00664* (2013.01); *G06K 9/6292* (2013.01); *G10L 13/043* (2013.01); *G10L 15/1815* (2013.01); *G10L 15/24* (2013.01); *G10L 15/26* (2013.01); *G10L 25/48* (2013.01); *B25J 9/0003* (2013.01); *G10L 25/21* (2013.01); *G10L 2015/088* (2013.01); *G10L 2015/223* (2013.01); *Y10S 901/01* (2013.01); *Y10S 901/46* (2013.01)

(56) References Cited

U.S. PATENT DOCUMENTS

| | | | |
|---|---|---|---|
| 10,388,279 B2* | 8/2019 | Gustafson | G06F 17/277 |
| 2005/0043956 A1* | 2/2005 | Aoyama | G10L 15/22 |
| | | | 704/276 |
| 2006/0047362 A1* | 3/2006 | Aoyama | G10L 15/22 |
| | | | 700/245 |
| 2011/0082874 A1* | 4/2011 | Gainsboro | G10L 15/265 |
| | | | 707/769 |
| 2011/0144999 A1* | 6/2011 | Jang | G06K 9/00892 |
| | | | 704/270.1 |
| 2013/0218339 A1* | 8/2013 | Maisonnier | B25J 11/0005 |
| | | | 700/257 |
| 2018/0218731 A1* | 8/2018 | Gustafson | G10L 25/48 |
| 2018/0293483 A1* | 10/2018 | Abramson | G06N 3/006 |

OTHER PUBLICATIONS

"BUDDY: Your Family's Companion Robot—Multi-language", https://www.youtube.com/watch?v=51yGC3iytbY (Year: 2015).*

* cited by examiner

Fig. 7

| Speaker | Speech Content | Timestamp |
|---|---|---|
| A | Did you play at all today? | 10/31/2016 17:32:15 |
| B | I read a book. | 10/31/2016 17:32:16 |
| A | Oh yeah? | 10/31/2016 17:32:18 |
| A | What book did you read? | 10/31/2016 17:32:19 |
| B | I read my Pinocchio book. | 10/31/2016 17:32:21 |
| ... | ... | ... |

Fig. 8

| Activity Name | Movement Amount | Audio Level | Date |
|---|---|---|---|
| Play superhero | 8.3 | 7.2 | 7/11/2016 |
| Pretend to be a car | 6.4 | 7.0 | 7/11/2016 |
| Play with dolls | 5.2 | 4.5 | 7/9/2016 |
| Book | 2.1 | 1.5 | 7/11/2016 |
| Blocks | 2.5 | 3.0 | 7/11/2016 |
| ... | ... | ... | ... |

Fig. 13

| Activity Name | Head | Abdomen | Arm | Leg | Posture Status |
| --- | --- | --- | --- | --- | --- |
| | At least | At least | At least | At least | |
| | At most | At most | At most | At most | |
| Play superhero | 8.0 | 8.0 | 8.0 | 8.0 | - Walking |
| | -- | -- | -- | -- | - Running |
| | | | | | - Standing |
| Dance | 7.0 | 7.0 | 7.0 | -- | - Walking |
| | -- | -- | -- | -- | - Running |
| Play with dolls | -- | -- | 5.0 | -- | - Sitting |
| | -- | 3.0 | -- | -- | - Bent over |
| Book | -- | -- | -- | -- | - Sitting |
| | 3.0 | 3.0 | 3.0 | -- | - Bent over |
| Blocks | -- | 3.0 | 3.0 | -- | - Sitting |
| | -- | -- | -- | -- | - Bent over |
| ... | ... | ... | | | ... |
| | ... | ... | | | |

# VOICE INTERACTION DEVICE, VOICE INTERACTION METHOD, VOICE INTERACTION PROGRAM, AND ROBOT

BACKGROUND OF THE INVENTION

1. Field of the Invention

The present disclosure relates to a voice interaction device, voice interaction method, voice interaction program, and robot that perform voice interaction with a plurality of users, and also relates to a voice interaction device, voice interaction method, voice interaction program, and robot that perform voice interaction with a single user.

2. Description of Related Art

Matters relevant to speech between participants in a conversation are discussed in the prior art (see, e.g., Japanese Patent Laid-open Publication No. 2016-6607, Japanese Patent Laid-open Publication No. 2013-73355, and Japanese Patent No. 5,300,497 (detailed description)).

In conversation between an adult and a child, providing a topic that is easy for the child to discuss is preferred.

However, further improvements over the prior art are required.

SUMMARY OF THE INVENTION

In order to resolve the above-noted concern, the present disclosure provides a voice interaction device, voice interaction method, voice interaction program, and robot that are capable of providing a topic corresponding to details of a child's activity, and of providing a topic that is easy for the child to discuss.

In one general aspect, the techniques disclosed here feature a device performing voice interaction with a plurality of users, the device comprising: a sensor obtaining image data of an area around the device; a microphone obtaining audio of the area around the device; a memory storing a plurality of image data corresponding to the plurality of users, the plurality of users including an adult and a child; an identifier identifying a person contained in the obtained image data based on the obtained image data and the stored plurality of image data, and outputting user information indicating the identified person; a voice recognizer extracting a voice from the obtained audio, extracting a feature value of the voice and text data corresponding to the voice, and associating the text data with the feature value and recording the associated text data and feature value in a first database; a first determiner determining, based on the user information and the first database, whether the adult and the child are conversing, and determining that the adult and the child are conversing when the adult and the child are the identified persons and the feature value contains a plurality of mutually dissimilar feature values; a second determiner determining, based on the first database, whether there is a need to provide a new topic to the adult and the child when the adult and the child are determined to be conversing, and determining that there is a need to provide a new topic to the adult and the child when a first key phrase is contained in the text data; an extractor extracting at least one candidate topic based on the first database and a second database when providing the topic is determined to be necessary, the second database storing at least one activity name indicating an activity the child was engaged in for a first predetermined period of time, the at least one candidate topic corresponding to the at least one activity name in the second database and not corresponding to the at least one activity name included in the text data recorded in the first database; a selector selecting from the at least one candidate topic one topic to provide to the adult and the child; a generator generating voice data containing the one topic; and a speaker outputting the generated voice data.

These general and specific aspects may be implemented using a system, a method, and a computer program, and any combination of systems, methods, and computer programs.

According to the present disclosure, a topic corresponding to the details of the child's activity can be provided, and a topic that is easy for the child to discuss can be provided.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7 illustrates an example of a conversation history database in the first embodiment;

FIG. 8 illustrates an example of a child activity database in the first embodiment;

FIG. 13 illustrates a table used when an activity name identifier identifies an activity name in the second embodiment, the table associating the activity name with a movement amount of various parts of a human body and a posture status;

DETAILED DESCRIPTION OF THE INVENTION

Figure 1:
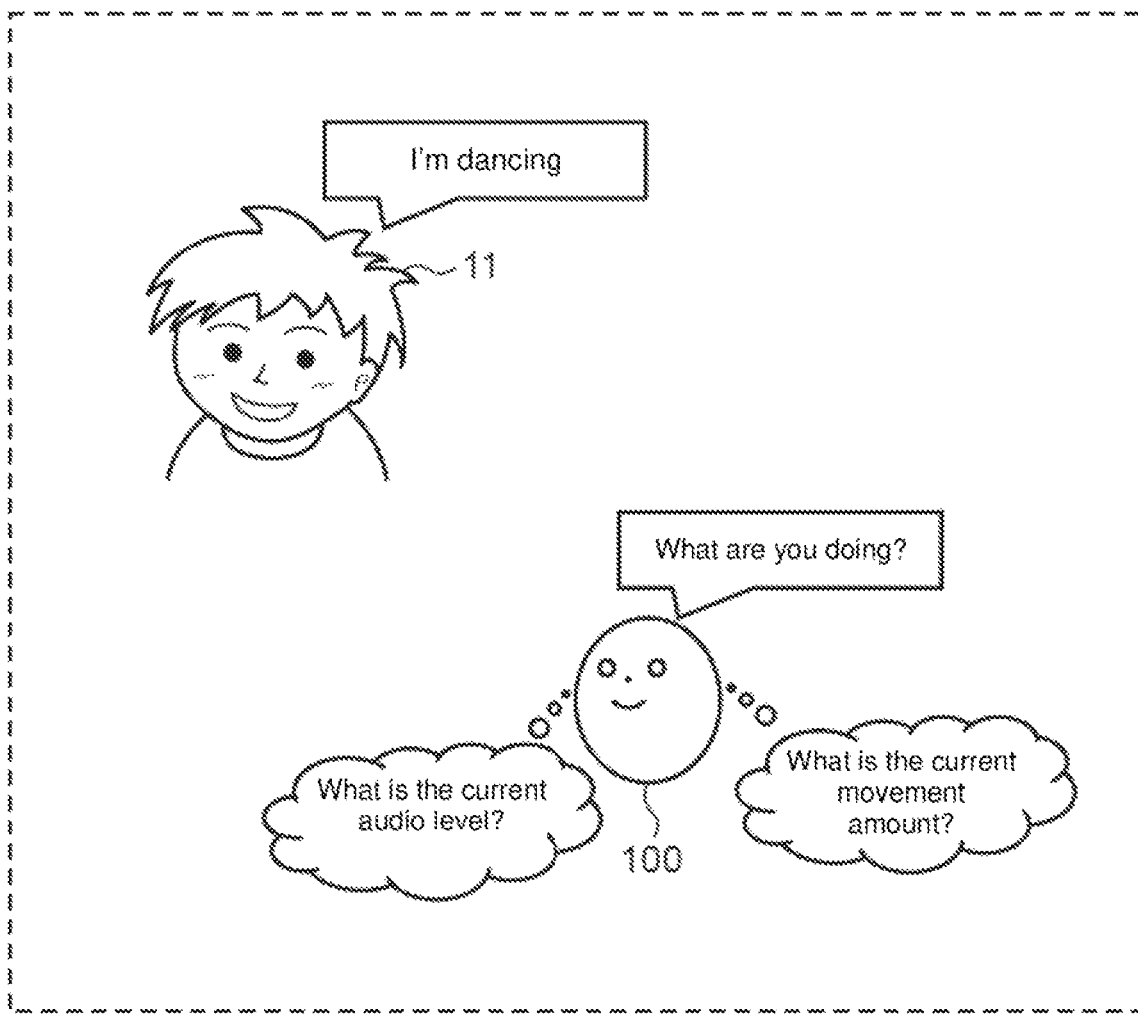
FIG. 1 is a conceptual diagram illustrating a process where a topic providing device converses with a child and specifies an activity name of an activity the child is currently performing, measures a movement amount and audio level of a voice of the child, and creates a database of the activity name, the movement amount, and the audio level.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Information Fundamental to the Present Disclosure Japanese Patent Laid-open Publication No. 2016-6607 discloses a conversation-type communication system that smoothly advances conversation-type communication performed over a network. In Japanese Patent Laid-open Publication No. 2016-6607, when a conversation between a plurality of users has stagnated, the conversation-type communication system randomly extracts from a word database a word appearing in a conversation on the conversation-type communication system within the most recent several months; randomly extracts from a position information database position information of a user terminal using the conversation-type communication system within the most recent several months; accesses and searches a search website or news website for a topic matching the extracted word and the position information; and provides a found topic (see, e.g., paragraph 0038). Also, the conversation-type communication system of Japanese Patent Laid-open Publication No. 2016-6607 displays text data or image data included in the found topic on a conversation-type communication screen (see, e.g., paragraph 0039).

In addition, Japanese Patent Laid-open Publication No. 2013-73355 discloses a conversation assistance device assisting a conversation between a plurality of speakers. In Japanese Patent Laid-open Publication No. 2013-73355, when the conversation is conducted via machine translation, the conversation assistance device presents supplemental information to supplement knowledge in response to the conversation. The conversation assistance device of Japanese Patent Laid-open Publication No. 2013-73355 extracts a keyword from the content of the speech of the participants in a conversation; outputs from a supplemental explanation database a plurality of supplemental information corresponding to the keyword; and selects from among the plurality of supplemental information and presents, in order of highest priority, a preset number of items of the supplemental information (see, e.g., paragraphs 0091, 0095, and 0097).

In addition, Japanese Patent No. 5,300,497 (detailed description) discloses a conversation device that converses with a user. In Japanese Patent No. 5,300,497 (detailed description), the conversation device gives a response to a user's speech, the response corresponding to an interest level of the user. The conversation device of Japanese Patent No. 5,300,497 extracts a major word from words configuring language expressed by the user; assesses a user interest level indicating at least a high or low degree of user interest; selects from a related word database a related word related to the major word, in response to the user interest level; and inserts the major word and related word into a fixed phrase corresponding to a hierarchical relationship of concepts between the major word and related word to create a response phrase (see, e.g., paragraph 0011).

However, in Japanese Patent Laid-open Publication No. 2016-6607 as described above, the topic matching the randomly extracted word that appeared in the past and the randomly extracted position information of the user terminal is found by searching the search website or the news website and is provided. Therefore, a topic corresponding to details of a child's activity cannot be provided, and a topic that is easy for the child to discuss cannot be provided.

Also, in Japanese Patent Laid-open Publication No. 2013-73355 discussed above, the keyword is extracted from the content of the speech of the participants in the conversation, and supplemental information corresponding to the keyword is presented in order of priority. Therefore, a topic corresponding to the details of the child's activity cannot be provided, and a topic that is easy for the child to discuss cannot be provided.

Also, in Japanese Patent No. 5,300,497 discussed above, although the response corresponding to the interest level of the user is given in response to the user's speech, a topic corresponding to the details of the child's activity cannot be provided, and a topic that is easy for the child to discuss cannot be provided.

(1) A device according to one aspect of the present disclosure is a device performing voice interaction with a plurality of users, the device comprising: a sensor obtaining image data of an area around the device; a microphone obtaining audio of the area around the device; a memory storing a plurality of image data corresponding to the plurality of users, the plurality of users including an adult and a child; an identifier identifying a person contained in the obtained image data based on the obtained image data and the stored plurality of image data, and outputting user information indicating the identified person; a voice recognizer extracting a voice from the obtained audio, extracting a feature value of the voice and text data corresponding to the voice, and associating the text data with the feature value and recording the associated text data and feature value in a first database; a first determiner determining, based on the user information and the first database, whether the adult and the child are conversing, and determining that the adult and the child are conversing when the adult and the child are the identified persons and the feature value contains a plurality of mutually dissimilar feature values; a second determiner determining, based on the first database, whether there is a need to provide a new topic to the adult and the child when the adult and the child are determined to be conversing, and determining that there is a need to provide a new topic to the adult and the child when a first key phrase is contained in the text data; an extractor extracting at least one candidate topic based on the first database and a second database when providing the topic is determined to be necessary, the second database storing at least one activity name indicating an activity the child was engaged in for a first predetermined period of time, the at least one candidate topic corresponding to the at least one activity name in the second database and not corresponding to the at least one activity name included in the text data recorded in the first database; a selector selecting from the at least one candidate topic one topic to provide to the adult and the child; a generator generating voice data containing the one topic; and a speaker outputting the generated voice data.

With this configuration, image data of the area around the device is obtained. Audio of the area around the device is obtained. The plurality of image data corresponding to the plurality of users is stored in the memory. The plurality of users include the adult and the child. The person contained in the obtained image data is identified based on the obtained image data and the stored plurality of image data, and the user information indicating the identified person is output. The voice is extracted from the obtained audio, the text data corresponding to the voice and the feature value of the voice are extracted, and the text data is associated with the feature value and the associated text data and feature value are recorded in the first database. The determination is made as to whether the adult and the child are conversing based on the user information and the first database. The adult and the child are determined to be conversing when the adult and the child are the identified persons and the feature value contains a plurality of mutually dissimilar feature values. The determination is made, based on the first database, as to whether there is a need to provide a new topic to the adult and the child when the adult and the child are determined to be conversing. There is determined to be a need to provide a new topic to the adult and the child when the first key phrase is contained in the text data. The at least one candidate topic is extracted based on the first database and the second database when providing the topic is determined to be necessary. The second database stores the at least one activity name indicating the activity the child was engaged in for the first predetermined period of time. The at least one candidate topic corresponds to the at least one activity name in the second database and does not correspond to the at least one activity name included in the text data recorded in the first database. The one topic to provide to the adult and the child is selected from the at least one candidate topic. The voice data containing the one topic is generated. The generated voice data is output.

Accordingly, based on the first database, where the text data indicating the conversation between the adult and the child is stored, and the second database, where the at least one activity name indicating the activity the child was engaged in for the first predetermined period of time is stored, at least one candidate topic is extracted that corresponds to the at least one activity name in the second database and does not correspond to the activity name included in the text data recorded in the first database, and the one topic to provide to the adult and the child is selected from the at least one candidate topic. Therefore, a topic corresponding to the details of the child's activity can be provided, and a topic that is easy for the child to discuss can be provided.

(2) In the aspect noted above, the second database may further store movement amount information indicating an amount of movement corresponding to the activity name, audio level information indicating an audio level corresponding to the activity name, and date information indicating a date corresponding to the activity name; the extractor may specify, based on the second database, the newest activity name, and may extract, as the at least one candidate topic, at least one second activity name different from the newest activity name and from the at least one activity name included in the text data; and the selector may select, as the one topic, a third activity name from the at least one second activity name based on a first movement amount corresponding to the newest activity name, a first audio level corresponding to the newest activity name, a second movement amount corresponding to the at least one second activity name among the activity names, and a second audio level corresponding to the at least one second activity name.

With this configuration, the second database further stores the movement amount information indicating the amount of movement corresponding to the activity name, the audio level information indicating the audio level corresponding to the activity name, and the date information indicating the date corresponding to the activity name. The newest activity name is specified based on the second database, and the at least one second activity name different from the newest activity name and from the at least one activity name included in the text data is extracted as the at least one candidate topic. The third activity name is selected, as the one topic, from the at least one second activity name based on the first movement amount corresponding to the newest activity name, the first audio level corresponding to the newest activity name, the second movement amount corresponding to the at least one second activity name among the activity names, and the second audio level corresponding to the at least one second activity name.

Accordingly, the at least one second activity name different from the newest activity name and from the at least one activity name included in the text data is extracted as the at least one candidate topic. Therefore, an activity name that has already appeared in the conversation between the adult and the child can be excluded from the at least one candidate topic, and a new topic can be provided.

(3) In the aspect noted above, the selector may select, as the third activity name, the second activity name having the largest sum calculated according to the following formula:

$$(A-B)^2+(C-D)^2$$

where A represents the first movement amount, B represents the second movement amount, C represents the first audio level, and D represents the second audio level.

With this configuration, the second activity name having the largest sum calculated according to the following formula is selected as the third activity name:

$$(A-B)^2+(C-D)^2$$

where A represents the first movement amount, B represents the second movement amount, C represents the first audio level, and D represents the second audio level.

Accordingly, the newest activity name refers to the second activity name that has a significantly different movement amount and audio level being selected as the third activity name. Therefore, a topic completely different from the current topic of the conversation can be provided.

(4) In the aspect noted above, the extractor may extract, as the at least one candidate topic, at least one second activity name different from the newest activity name and from the at least one activity name included in the text data, the at least one second activity name being recorded in a second predetermined period of time.

With this configuration, at least one second activity name different from the newest activity name and from the at least one activity name included in the text data, the at least one second activity name being recorded in the second predetermined period of time, is extracted as the at least one candidate topic. Therefore, the candidate topic can be extracted from the comparatively new at least one second activity name.

(5) In the aspect noted above, the movement amount information may be a value obtained by multiplying a first coefficient by the movement amount, and the audio level information may be a value obtained by multiplying a second coefficient by the audio level.

With this configuration, the movement amount information is the value obtained by multiplying the first coefficient by the movement amount, and the audio level information is the value obtained by multiplying the second coefficient by the audio level. Therefore, a scale of the movement amount and a scale of the audio level can be aligned.

(6) In the aspect noted above, when a third movement amount corresponding to the third activity name is equal to or greater than a first threshold value, based on the second database, the generator may generate the voice data containing a second key phrase and, when the third movement amount corresponding to the third activity name is less than the first threshold value, based on the second database, the generator may generate the voice data containing a third key phrase.

With this configuration, when the third movement amount corresponding to the third activity name is equal to or greater than the first threshold value, based on the second database, the voice data containing the second key phrase is generated. Also, when the third movement amount corresponding to the third activity name is less than the first threshold value, based on the second database, the voice data containing the third key phrase is generated. Therefore, different voice data can be output in response to a magnitude of the movement amount.

(7) In the aspect noted above, the second key phrase and the third key phrase may contain phrasing providing feedback on the child's engagement level in the third activity name, and a meaning indicated by the second key phrase may be the opposite of a meaning indicated by the third key phrase.

With this configuration, the second key phrase and the third key phrase contain the phrasing providing feedback on the child's engagement level in the third activity name. The meaning indicated by the second key phrase is the opposite of the meaning indicated by the third key phrase. Accordingly, a topic that is easier for the child to discuss can be provided.

(8) In the aspect noted above, when a third audio level corresponding to the third activity name is equal to or greater than a first threshold value, based on the second database, the generator may generate the voice data containing the second key phrase and, when the third audio level corresponding to the third activity name is less than the first threshold value, based on the second database, the generator may generate the voice data containing the third key phrase.

With this configuration, when the third audio level corresponding to the third activity name is equal to or greater than the first threshold value, based on the second database, the voice data containing the second key phrase is generated. Also, when the third audio level corresponding to the third activity name is less than the first threshold value, based on the second database, the voice data containing the third key phrase is generated. Therefore, different voice data can be output in response to a magnitude of the audio level.

(9) In the aspect noted above, the second key phrase and the third key phrase may contain the phrasing providing feedback on the child's engagement level in the third activity name, and the meaning indicated by the second key phrase may be the opposite of the meaning indicated by the third key phrase.

With this configuration, the second key phrase and the third key phrase contain the phrasing providing feedback on the child's engagement level in the third activity name. The meaning indicated by the second key phrase is the opposite of the meaning indicated by the third key phrase. Accordingly, a topic that is easier for the child to discuss can be provided.

(10) In the aspect noted above, the feature value may contain a voice-print of a speaker from whom the voice issues. With this configuration, the person can be more accurately recognized using the voice-print of the speaker from whom the voice issues.

(11) In the aspect noted above, the first key phrase may include wording that indicates the topic. With this configuration, the adult or the child can request a new topic from the device.

(12) A robot according to another aspect of the present disclosure includes the device (1) previously recited, a casing incorporating the device, and a displacement mechanism displacing the casing. With this configuration, the device can be applied to a robot.

(13) A method according to another aspect of the present disclosure is a method in a device performing voice interaction with a plurality of users, the method comprising: obtaining image data of an area around the device; obtaining audio of the area around the device; identifying a person contained in the obtained image data based on the obtained image data and a plurality of image data stored in a memory storing a plurality of image data corresponding to the plurality of users, and outputting user information indicating the identified person, the plurality of users including an adult and a child; extracting a voice from the obtained audio, extracting a feature value of the voice and text data corresponding to the voice, and associating the text data with the feature value and recording the associated text data and feature value in a first database; determining, based on the user information and the first database, whether the adult and the child are conversing, and when the adult and the child are the identified persons and the feature value contains a plurality of mutually dissimilar feature values, determining that the adult and the child are conversing; determining, based on the first database, whether there is a need to provide a new topic to the adult and the child when the adult and the child are determined to be conversing, and determining that there is a need to provide a new topic to the adult and the child when a first key phrase is contained in the text data; extracting at least one candidate topic based on the first database and a second database when providing the topic is determined to be necessary, the second database storing at least one activity name indicating an activity the child was engaged in for a first predetermined period of time, the at least one candidate topic corresponding to the at least one activity name in the second database and not corresponding to the at least one activity name included in the text data recorded in the first database; selecting from the at least one candidate topic one topic to provide to the adult and the child; generating voice data containing the one topic; and outputting the generated voice data.

With this configuration, image data of the area around the device is obtained. Audio of the area around the device is obtained. The person contained in the obtained image data is identified based on the obtained image data and the plurality of image data stored in the memory storing the plurality of image data corresponding to the plurality of users, and the user information indicating the identified person is output. The plurality of users include the adult and the child. The voice is extracted from the obtained audio, the text data corresponding to the voice and the feature value of the voice are extracted, and the text data is associated with the feature value and the associated text data and feature value are recorded in the first database. The determination is made as to whether the adult and the child are conversing based on the user information and the first database. The adult and the child are determined to be conversing when the adult and the child are the identified persons and the feature value contains a plurality of mutually dissimilar feature values. The determination is made, based on the first database, as to whether there is a need to provide a new topic to the adult and the child when the adult and the child are determined to be conversing. There is determined to be a need to provide a new topic to the adult and the child when the first key phrase is contained in the text data. The at least one candidate topic is extracted based on the first database and the second database when providing the topic is determined to be necessary. The second database stores the at least one activity name indicating the activity the child was engaged in for the first predetermined period of time. The at least one candidate topic corresponds to the at least one activity name in the second database and does not correspond to the at least one activity name included in the text data recorded in the first database. The one topic to provide to the adult and the child is selected from the at least one candidate topic. The voice data containing the one topic is generated. The generated voice data is output.

Accordingly, based on the first database, where the text data indicating the conversation between the adult and the child is stored, and the second database, where the at least one activity name indicating the activity the child was engaged in for the first predetermined period of time is stored, at least one candidate topic is extracted that corresponds to the at least one activity name in the second database and does not correspond to the activity name included in the text data recorded in the first database, and the one topic to provide to the adult and the child is selected from the at least one candidate topic. Therefore, a topic corresponding to the details of the child's activity can be provided, and a topic that is easy for the child to discuss can be provided.

(14) A program according to another aspect of the present disclosure is a program for performing voice interaction with a plurality of users, the program causing a processor provided to a device performing voice interaction with the plurality of users to carry out operations as: an identifier identifying a person contained in obtained image data based on image data of an area around the device obtained by a sensor and a plurality of image data stored in a memory storing a plurality of image data corresponding to the plurality of users, and outputting user information indicating the identified person, the plurality of users including an adult and a child; a voice recognizer extracting a voice from audio of the area around the device obtained by a microphone, extracting a feature value of the voice and text data corresponding to the voice, and associating the text data with the feature value and recording the associated text data and feature value in a first database; a first determiner determining, based on the user information and the first database, whether the adult and the child are conversing, and determining that the adult and the child are conversing when the adult and the child are the identified persons and the feature value contains a plurality of mutually dissimilar feature values; a second determiner determining, based on the first database, whether there is a need to provide a new topic to the adult and the child when the adult and the child are determined to be conversing, and determining that there is a need to provide a new topic to the adult and the child when a first key phrase is contained in the text data; an extractor extracting at least one candidate topic based on the first database and a second database when providing the topic is determined to be necessary, the second database storing at least one activity name indicating an activity the child was engaged in for a first predetermined period of time, the at least one candidate topic corresponding to the at least one activity name in the second database and not corresponding to the at least one activity name included in the text data recorded in the first database; a selector selecting from the at least one candidate topic one topic to provide to the adult and the child; and a generator generating voice data containing the one topic, and outputting the generated voice data to a speaker.

With this configuration, the person contained in the obtained image data is identified based on the image data of the area around the device obtained by the sensor and the plurality of image data stored in the memory storing the plurality of image data corresponding to the plurality of users, and the user information indicating the identified person is output. The plurality of users include the adult and the child. The voice is extracted from the audio of the area around the device obtained by the microphone, the text data corresponding to the voice and the feature value of the voice are extracted, and the text data is associated with the feature value and the associated text data and feature value are recorded in the first database. The determination is made as to whether the adult and the child are conversing based on the user information and the first database. The adult and the child are determined to be conversing when the adult and the child are the identified persons and the feature value contains a plurality of mutually dissimilar feature values. The determination is made, based on the first database, as to whether there is a need to provide a new topic to the adult and the child when the adult and the child are determined to be conversing. There is determined to be a need to provide a new topic to the adult and the child when the first key phrase is contained in the text data. The at least one candidate topic is extracted based on the first database and the second database when providing the topic is determined to be necessary. The second database stores the at least one activity name indicating the activity the child was engaged in for the first predetermined period of time. The at least one candidate topic corresponds to the at least one activity name in the second database and does not correspond to the at least one activity name included in the text data recorded in the first database. The one topic to provide to the adult and the child is selected from the at least one candidate topic. The voice data containing the one topic is generated. The generated voice data is output to the speaker.

Accordingly, based on the first database, where the text data indicating the conversation between the adult and the child is stored, and the second database, where the at least one activity name indicating the activity the child was engaged in for the first predetermined period of time is stored, at least one candidate topic is extracted that corresponds to the at least one activity name in the second database and does not correspond to the activity name included in the text data recorded in the first database, and the one topic to provide to the adult and the child is selected from the at least one candidate topic. Therefore, a topic corresponding to the details of the child's activity can be provided, and a topic that is easy for the child to discuss can be provided.

(15) A device according to another aspect of the present disclosure is a device performing voice interaction with a user, the device comprising: a sensor obtaining image data of an area around the device, and distance data indicating a distance to an object, including a person, present in the area around the device; a microphone obtaining audio of the area around the device; a memory; an audio level measurer extracting a voice from the obtained audio and outputting audio level information indicating an audio level of the extracted voice; a person identifier identifying a person contained in the obtained image data based on the obtained image data and image data corresponding to the user stored in the memory, and outputting user information indicating the identified person, the user including a child; a posture identifier identifying, when the person indicated by the user information is the child, a posture of the child based on the obtained image data, the obtained distance data, and kinetic template data that is stored in the memory and indicates a three-dimensional frame position of a human body in various postures, and outputting posture information indicating the identified posture of the child; a movement amount measurer, when the person indicated by the user information is the child, calculating as a movement amount an amount of change in a position of a specified part of the child over a first predetermined period of time, based on the obtained image data, the obtained distance data, and the stored kinetic template data, and outputting movement amount information indicating the movement amount; an activity name identifier identifying an activity name of an activity the child is currently performing, based on the posture information, the movement amount information, and a table indicating a correspondence between an activity name that the child performs stored in the memory, a movement amount corresponding to the activity name, and a posture of the child corresponding to the activity name, or based on a noun contained in the extracted voice, the activity name identifier then outputting activity information indicating the identified activity name; a generator generating first voice data containing a key phrase corresponding to the activity name indicated by the activity information, the first voice data being expressed by a question; a speaker outputting the first voice data; a voice recognizer recognizing meaning in a voice extracted from audio obtained after the first voice data is output, and outputting text data reflecting the meaning of the recognized voice; a determiner determining whether an affirmative word is contained in the text data; and a recorder that, when the affirmative word is determined to be contained in the text data, associates the activity information, the movement amount information, and the audio level information, and records the associated information in a database.

With this configuration, image data of the area around the device, and distance data indicating the distance to an object, including a person, present in the area around the device, are obtained. Audio of the area around the device is obtained. The voice is extracted from the obtained audio and the audio level information indicating the audio level of the extracted voice is output. The person contained in the obtained image data is identified based on the obtained image data and the image data corresponding to the user stored in the memory, and the user information indicating the identified person is output. The user includes the child. When the person indicated by the user information is the child, the posture of the child is identified based on the obtained image data, the obtained distance data, and the kinetic template data that is stored in the memory and indicates the three-dimensional frame position of a human body in various postures, and the posture information indicating the identified posture of the child is output. When the person indicated by the user information is the child, the amount of change in the position of the specified part of the child over the first predetermined period of time is calculated as the movement amount, based on the obtained image data, the obtained distance data, and the stored kinetic template data, and the movement amount information indicating the movement amount is output. The activity name of the activity the child is currently performing is identified based on the posture information, the movement amount information, and the table indicating the correspondence between an activity name that the child performs that is stored in the memory, the movement amount corresponding to the activity name, and the posture of the child corresponding to the activity name, or based on a noun contained in the extracted voice, and the activity information indicating the identified activity name is output. The first voice data containing the key phrase corresponding to the activity name indicated by the activity information is generated. The first voice data is expressed by a question. The first voice data is output. The meaning in the voice extracted from audio obtained after the first voice data is output is recognized, and the text data reflecting the meaning of the recognized voice is output. The determination is made as to whether the affirmative word is contained in the text data. When the affirmative word is determined to be contained in the text data, the activity information is associated with the movement amount information and the audio level information, and the associated information is recorded in the database.

Accordingly, the activity name of the activity the child is currently performing is identified based on the posture and the movement amount of the child, or based on the noun contained in the extracted voice, and the activity information indicating the identified activity name is associated with the movement amount information and the audio level information, and the associated information is recorded in the database. Therefore, a database corresponding to the child can be readily created.

In addition, by using the database in which the activity information indicating the activity name is associated with the movement amount information and the audio level information, a topic corresponding to the details of the child's activity can be provided, and a topic that is easy for the child to discuss can be provided.

(16) In the aspect noted above, the first voice data may contain text data inquiring whether the child is performing the identified activity.

With this configuration, the first voice data contains text data inquiring whether the child is performing the identified activity. Therefore, the activity the child is actually performing can be reliably specified.

(17) In the aspect noted above, when the determiner determines that the text data does not contain the affirmative word, the determiner determines whether the text data contains a negation, and when the determiner determines that the text data does not contain the negation, the determiner determines whether the text data contains a noun, and when the text data is determined to contain the noun, the activity name identifier may identify that the noun indicates the activity name of the activity the child is currently performing.

With this configuration, when the text data is determined to not contain the affirmative word, the determination is made as to whether the text data contains the negation. When the text data is determined to not contain the negation, the determination is made as to whether the text data contains the noun, and when the text data is determined to contain the noun, the noun is identified as indicating the activity the child is currently performing.

Accordingly, when the identified activity name is refuted by the child, the noun contained in the text data of the child's response can be specified as the activity the child is currently performing.

(18) In the aspect noted above, when the activity name identifier determines that the text data does not contain the noun, the generator may generate second voice data to inquire as to what the child is doing, and the speaker may output the second voice data.

With this configuration, when the determination is made that the text data does not contain the noun, the second voice data to inquire as to what the child is doing is generated and the second voice data is output. Therefore, the activity the child is currently performing can be accurately specified.

(19) In the aspect noted above, the movement amount measurer may calculate, as the movement amount, an average value of the amount of change in a second predetermined period of time that includes the first predetermined period of time, and the audio level measurer may output, as the audio level information, an average value of an audio level of a voice extracted during the second predetermined period of time.

With this configuration, the average value of the amount of change in the second predetermined period of time that includes the first predetermined period of time is calculated as the movement amount. In addition, the average value of the audio level of the voice extracted during the second predetermined period of time is output as the audio level information.

Accordingly, the average value of the amount of change in the second predetermined period of time can be calculated as the movement amount, and the average value of the audio level of the voice extracted during the second predetermined period of time can be output as the audio level information.

(20) In the aspect noted above, the recorder may record in the database, as the movement amount information, the movement amount multiplied by a first coefficient and may record in the database, as the audio level information, the audio level multiplied by a second coefficient, the first coefficient being a value obtained by dividing a predetermined first constant by a second constant, and the second coefficient being a value obtained by dividing a predetermined third constant by the second constant.

With this configuration, the movement amount multiplied by the first coefficient is recorded in the database as the movement amount information, and the audio level multiplied by the second coefficient is recorded in the database as the audio level information. The first coefficient is the value obtained by dividing the predetermined first constant by the second constant, and the second coefficient is the value obtained by dividing the predetermined third constant by the second constant. Accordingly, the scale of the movement amount and the scale of the audio level can be aligned.

(21) A robot according to another aspect of the present disclosure includes the device (15) previously recited, a casing incorporating the device, and a displacement mechanism displacing the casing. With this configuration, the device can be applied to a robot.

(22) A method according to another aspect of the present disclosure is a method in a device performing voice interaction with a user, the method comprising: obtaining image data of an area around the device, and distance data indicating a distance to an object, including a person, present in the area around the device; obtaining audio of the area around the device; extracting a voice from the obtained audio and outputting audio level information indicating an audio level of the extracted voice; identifying a person contained in the obtained image data based on the obtained image data and image data corresponding to the user stored in a memory, and outputting user information indicating the identified person, the user including a child; identifying, when the person indicated by the user information is the child, a posture of the child based on the obtained image data, the obtained distance data, and kinetic template data that is stored in the memory and indicates a three-dimensional frame position of a human body in various postures, and outputting posture information indicating the identified posture of the child; calculating as a movement amount, when the person indicated by the user information is the child, an amount of change in a position of a specified part of the child over a first predetermined period of time, based on the obtained image data, the obtained distance data, and the stored kinetic template data, and outputting movement amount information indicating the movement amount; identifying an activity name of an activity the child is currently performing, based on the posture information, the movement amount information, and a table indicating a correspondence between an activity name that the child performs stored in the memory and a movement amount corresponding to the activity name, or based on a noun contained in the extracted voice, then outputting activity information indicating the identified activity name; generating first voice data containing a key phrase corresponding to the activity name indicated by the activity information, the first voice data being expressed by a question; outputting the first voice data; recognizing meaning in a voice extracted from audio obtained after the first voice data is output, and outputting text data reflecting the meaning of the recognized voice; determining whether an affirmative word is contained in the text data; and when the affirmative word is determined to be contained in the text data, associating the activity information, the movement amount information, and the audio level information, and recording the associated information in a database.

With this configuration, image data of the area around the device, and distance data indicating the distance to an object, including a person, present in the area around the device, are obtained. Audio of the area around the device is obtained. The voice is extracted from the obtained audio and the audio level information indicating the audio level of the extracted voice is output. The person contained in the obtained image data is identified based on the obtained image data and the image data corresponding to the user stored in the memory, and the user information indicating the identified person is output. The user includes the child. When the person indicated by the user information is the child, the posture of the child is identified based on the obtained image data, the obtained distance data, and the kinetic template data that is stored in the memory and indicates the three-dimensional frame position of a human body in various postures, and the posture information indicating the identified posture of the child is output. When the person indicated by the user information is the child, the amount of change in the position of the specified part of the child over the first predetermined period of time is calculated as the movement amount, based on the obtained image data, the obtained distance data, and the stored kinetic template data, and the movement amount information indicating the movement amount is output. The activity name of the activity the child is currently performing is identified based on the posture information, the movement amount information, and the table indicating the correspondence between an activity name that the child performs that is stored in the memory, the movement amount corresponding to the activity name, and the posture of the child corresponding to the activity name, or based on a noun contained in the extracted voice, and the activity information indicating the identified activity name is output. The first voice data containing the key phrase corresponding to the activity name indicated by the activity information is generated. The first voice data is expressed by a question. The first voice data is output. The meaning in the voice extracted from audio obtained after the first voice data is output is recognized, and the text data reflecting the meaning of the recognized voice is output. The determination is made as to whether the affirmative word is contained in the text data. When the affirmative word is determined to be contained in the text data, the activity information is associated with the movement amount information and the audio level information, and the associated information is recorded in the database.

Accordingly, the activity name of the activity the child is currently performing is identified based on the posture and the movement amount of the child, or based on the noun contained in the extracted voice, and the activity information indicating the identified activity name is associated with the movement amount information and the audio level information, and the associated information is recorded in the database. Therefore, a database corresponding to the child can be readily created.

In addition, by using the database in which the activity information indicating the activity name is associated with the movement amount information and the audio level information, a topic corresponding to the details of the child's activity can be provided, and a topic that is easy for the child to discuss can be provided.

(23) A program according to another aspect of the present disclosure is a program for performing voice interaction with a user, the program causing a processor provided to a device performing voice interaction with the user to carry out operations as: an audio level measurer extracting a voice from audio of an area around the device obtained by a microphone, and outputting audio level information indicating an audio level of the extracted voice; a person identifier identifying a person contained in the obtained image data based on image data of the area around the device obtained by a sensor and image data corresponding to the user stored in a memory, and outputting user information indicating the identified person, the user including a child; a posture identifier identifying, when the person indicated by the user information is the child, a posture of the child based on the obtained image data, distance data obtained by the sensor and indicating a distance to an object, including a person, present in the area around the device, and kinetic template data that is stored in the memory and indicates a three-dimensional frame position of a human body in various postures, and outputting posture information indicating the identified posture of the child; a movement amount measurer, when the person indicated by the user information is the child, calculating as a movement amount an amount of change in a position of a specified part of the child over a first predetermined period of time, based on the obtained image data, the obtained distance data, and the stored kinetic template data, and outputting movement amount information indicating the movement amount; an activity name identifier identifying an activity name of an activity the child is currently performing, based on the posture information, the movement amount information, and a table indicating a correspondence between an activity name that the child performs stored in the memory and a movement amount corresponding to the activity name, or based on a noun contained in the extracted voice, then outputting activity information indicating the identified activity name; a generator generating first voice data containing a key phrase corresponding to the activity name indicated by the activity information, and outputting the first voice data to a speaker, the first voice data being expressed by a question; a voice recognizer recognizing meaning in a voice extracted from audio obtained after the first voice data is output, and outputting text data reflecting the meaning of the recognized voice; a determiner determining whether an affirmative word is contained in the text data; and a recorder that, when the affirmative word is determined to be contained in the text data, associates the activity information, the movement amount information, and the audio level information, and records the associated information in a database.

With this configuration, the voice is extracted from the audio of the area around the device obtained by the microphone, and the audio level information indicating the audio level of the extracted voice is output. The person contained in the obtained image data is identified based on the image data of the area around the device obtained by the sensor and the image data corresponding to the user stored in the memory, and the user information indicating the identified person is output. The user includes the child. When the person indicated by the user information is the child, the posture of the child is identified based on the obtained image data, the distance data obtained by the sensor and indicating the distance to an object, including a person, present in the area around the device, and the kinetic template data that is stored in the memory and indicates the three-dimensional frame position of a human body in various postures, and the posture information indicating the identified posture of the child is output. When the person indicated by the user information is the child, the amount of change in the position of the specified part of the child over the first predetermined period of time is calculated as the movement amount, based on the obtained image data, the obtained distance data, and the stored kinetic template data, and the movement amount information indicating the movement amount is output. The activity name of the activity the child is currently performing is identified based on the posture information, the movement amount information, and the table indicating the correspondence between an activity name that the child performs stored in the memory and the movement amount corresponding to the activity name, or based on the noun contained in the extracted voice, then the activity information indicating the identified activity name is output. The first voice data containing the key phrase corresponding to the activity name indicated by the activity information is generated, and the first voice data is output to the speaker. The first voice data is expressed by a question. The meaning in the voice extracted from the audio obtained after the first voice data is output is recognized, and the text data reflecting the meaning of the recognized voice is output. The determination is made as to whether the affirmative word is contained in the text data. When the affirmative word is determined to be contained in the text data, the activity information is associated with the movement amount information and the audio level information, and the associated information is recorded in the database.

Accordingly, the activity name of the activity the child is currently performing is identified based on the posture and the movement amount of the child, or based on the noun contained in the extracted voice, and the activity information indicating the identified activity name is associated with the movement amount information and the audio level information, and the associated information is recorded in the database. Therefore, a database corresponding to the child can be readily created.

In addition, by using the database in which the activity information indicating the activity name is associated with the movement amount information and the audio level information, a topic corresponding to the details of the child's activity can be provided, and a topic that is easy for the child to discuss can be provided.

Hereafter, various embodiments of the present disclosure are described with reference to the drawings. The following embodiments are merely exemplary instantiations of the present disclosure, and do not limit the technical scope of the present disclosure. Also, identical reference numerals are used for identical structural elements in the various drawings.

First Embodiment

Initially, a conversation between a topic providing device, a child (in early childhood, for example), and an adult (for example, the child's parent or the like) is described with reference to FIGS. 1 to 4. A conversation between a topic providing device 100, the child, and the adult proceeds in order of the scenes illustrated in FIGS. 1 to 4.

In each of the embodiments of the present disclosure, the child is illustrated as a young child aged between three and six.

FIG. 1 is a conceptual diagram illustrating a process where the topic providing device converses with the child and specifies an activity name of an activity the child is currently performing, and also where a movement amount and audio level of a voice of the child are measured and a database of the activity name, the movement amount, and the audio level is created. In FIG. 1, the topic providing device 100 converses with a child 11 and asks what the child is doing right now, i.e., specifies an activity name (for example, dancing) for an activity the child 11 is performing. At that point, the topic providing device 100 measures an audio level of the voice of the child 11 and a movement amount of the child 11, and creates a database of the activity name, the movement amount, and the audio level. Moreover, the process depicted in FIG. 1 corresponds to a process performed by a second processor of the topic providing device 100. The second processor is described in detail in the second embodiment.

Figure 2:
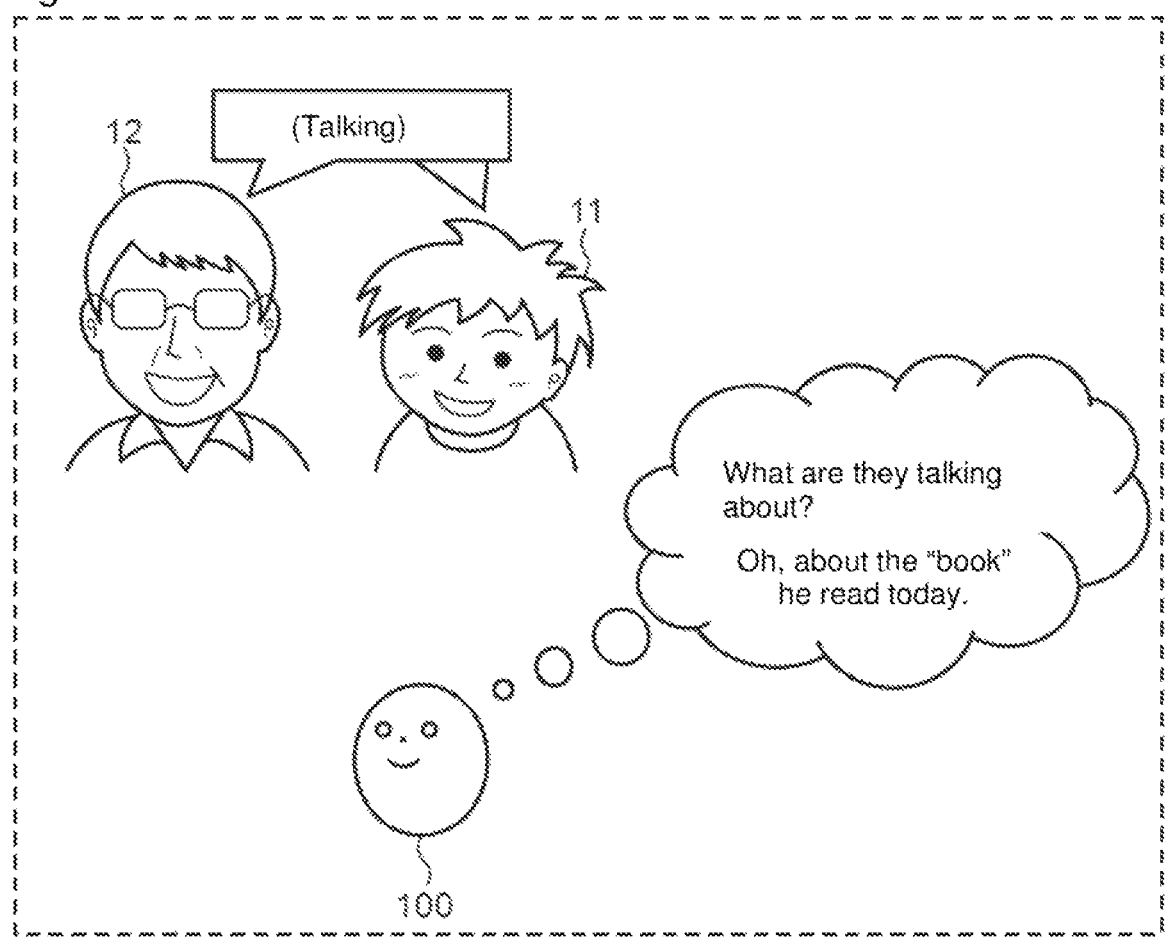
FIG. 2 is a conceptual diagram illustrating a process where, when a parent and child are engaged in conversation, the topic providing device specifies a topic of the conversation.

FIG. 2 is a conceptual diagram illustrating a process where, when the parent and child are engaged in conversation, the topic providing device 100 specifies a topic for the conversation. FIG. 2 depicts an exemplary case where the topic specified by the topic providing device 100 is "book." For example, at night, a parent 12 asks the child 11 what the child 11 did when playing that day. In response, the child 11 answers that he or she read a book. At this time, the topic providing device 100 specifies the current topic between the parent 12 and the child 11 as "book." Moreover, the process depicted in FIG. 2 corresponds to a process performed by a first processor of the topic providing device 100. The first processor is described in detail in the first embodiment.

Figure 3:
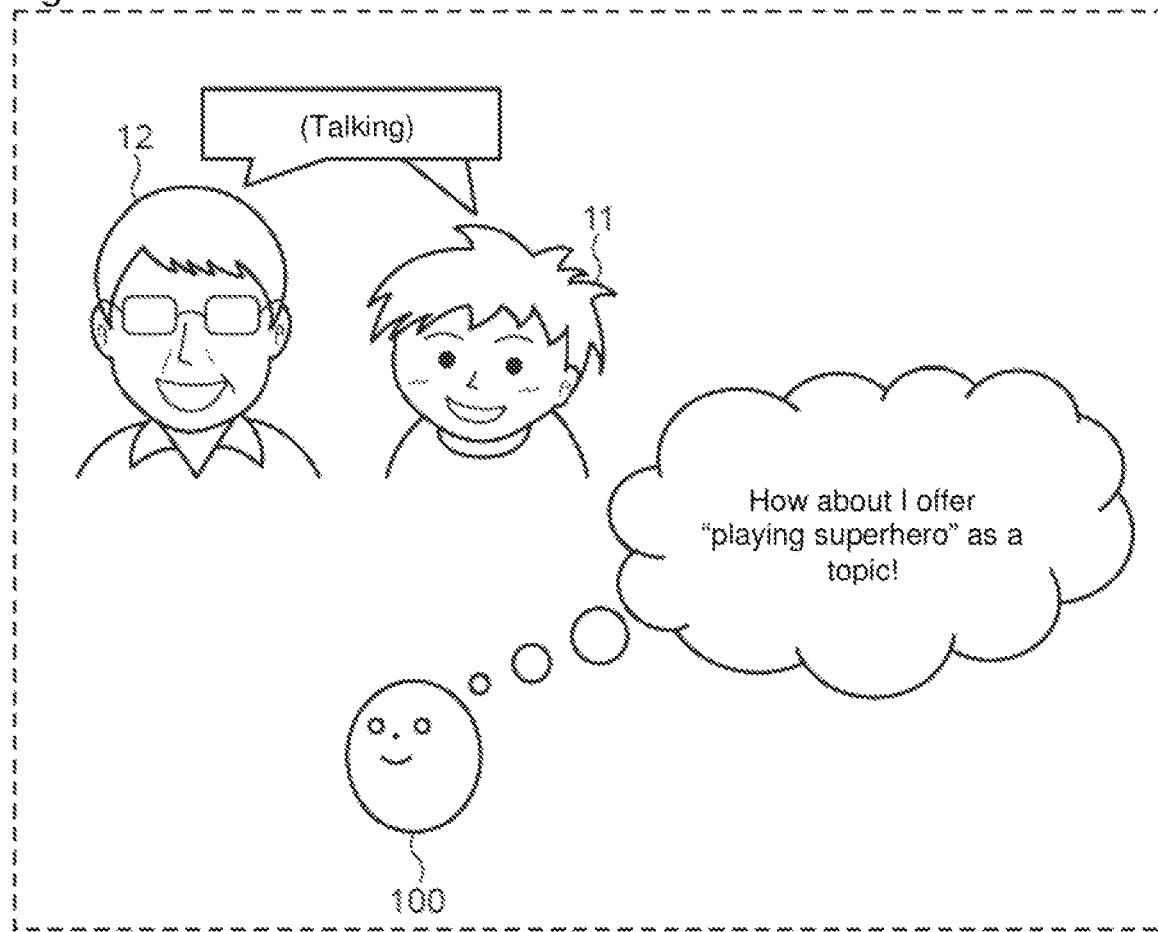
FIG. 3 is a conceptual diagram illustrating a process where the topic providing device selects a topic to provide to the parent and child next.

FIG. 3 is a conceptual diagram illustrating a process where the topic providing device 100 selects a topic to provide to the parent 12 and child 11 next. The topic providing device 100 selects the topic to provide to the parent 12 and the child 11 next based on the current topic (FIG. 2) and the previously generated database (FIG. 1). FIG. 3 depicts an exemplary case where the topic providing device 100 selects "playing superhero" as the next topic to provide to the parent 12 and the child 11. An objective of the present disclosure is to provide an opportunity to enrich the conversation between the parent 12 and the child 11 by introducing an unpredictable topic. To do this, the topic providing device 100 selects, as the topic to introduce next, a topic (for example, a comparatively energetic activity such as playing superhero) where the movement amount of the child 11 and the audio level of the voice of the child 11 differ greatly from the current topic (for example, an activity with comparatively little movement, such as reading a book). The process depicted in FIG. 3 corresponds to a process performed by the first processor of the topic providing device 100. The first processor is described in detail in the first embodiment.

Figure 4:
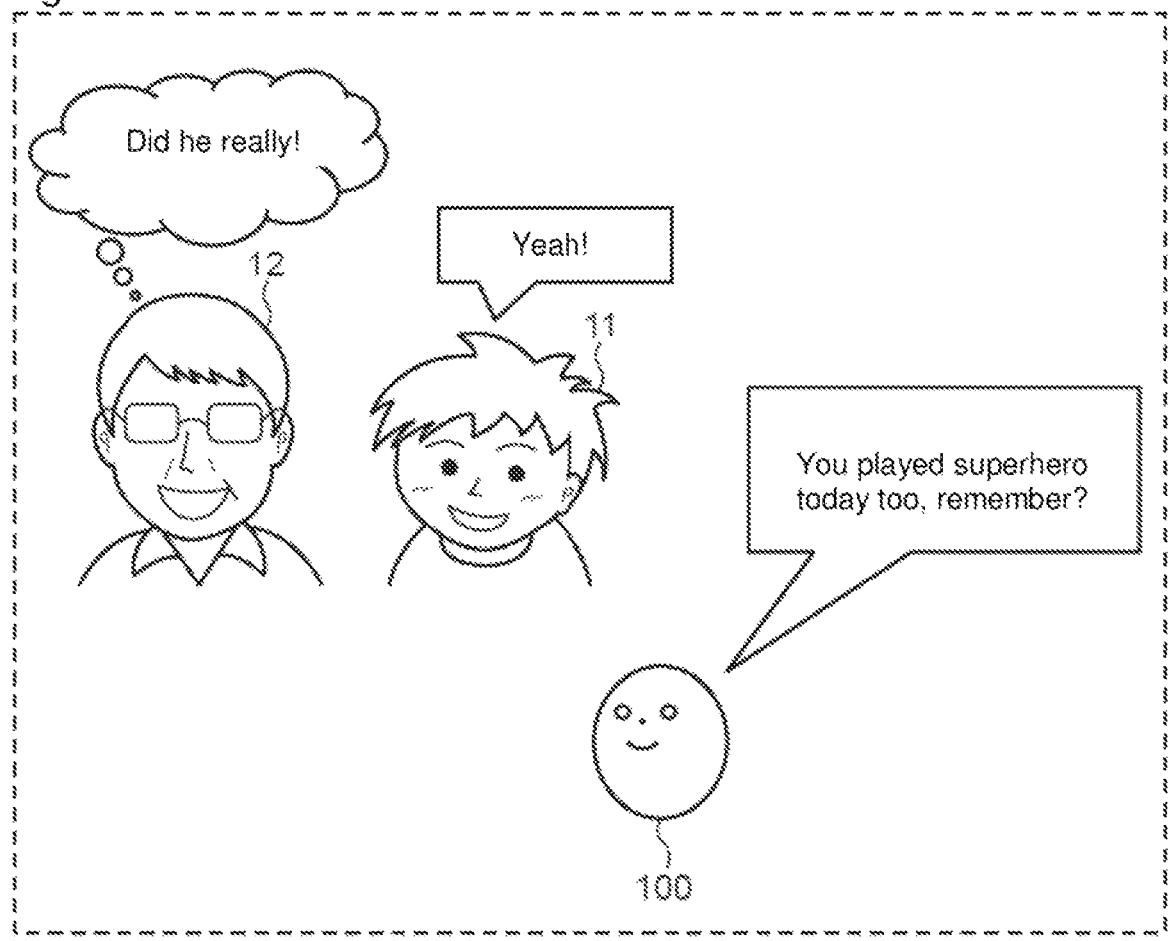
FIG. 4 is a conceptual diagram illustrating a process where the topic providing device provides the selected topic to the parent and child.

FIG. 4 is a conceptual diagram illustrating a process where the topic providing device 100 provides the selected topic to the parent 12 and child 11. FIG. 4 depicts an exemplary case where the topic providing device 100 provides "playing superhero" as the next topic. In this case, the topic providing device 100 outputs speech saying "You played superhero today too, remember?" The child 11 responds to the speech output of the topic providing device 100 by saying "Yeah!" By introducing a new topic in this way, the parent 12 especially learns what the child 11 did that day, providing motivation for the parent 12 and the child 11 to talk about "playing superhero" next. Moreover, the process depicted in FIG. 4 corresponds to a process performed by the first processor of the topic providing device 100. The first processor is described in detail in the first embodiment.

Figure 5:
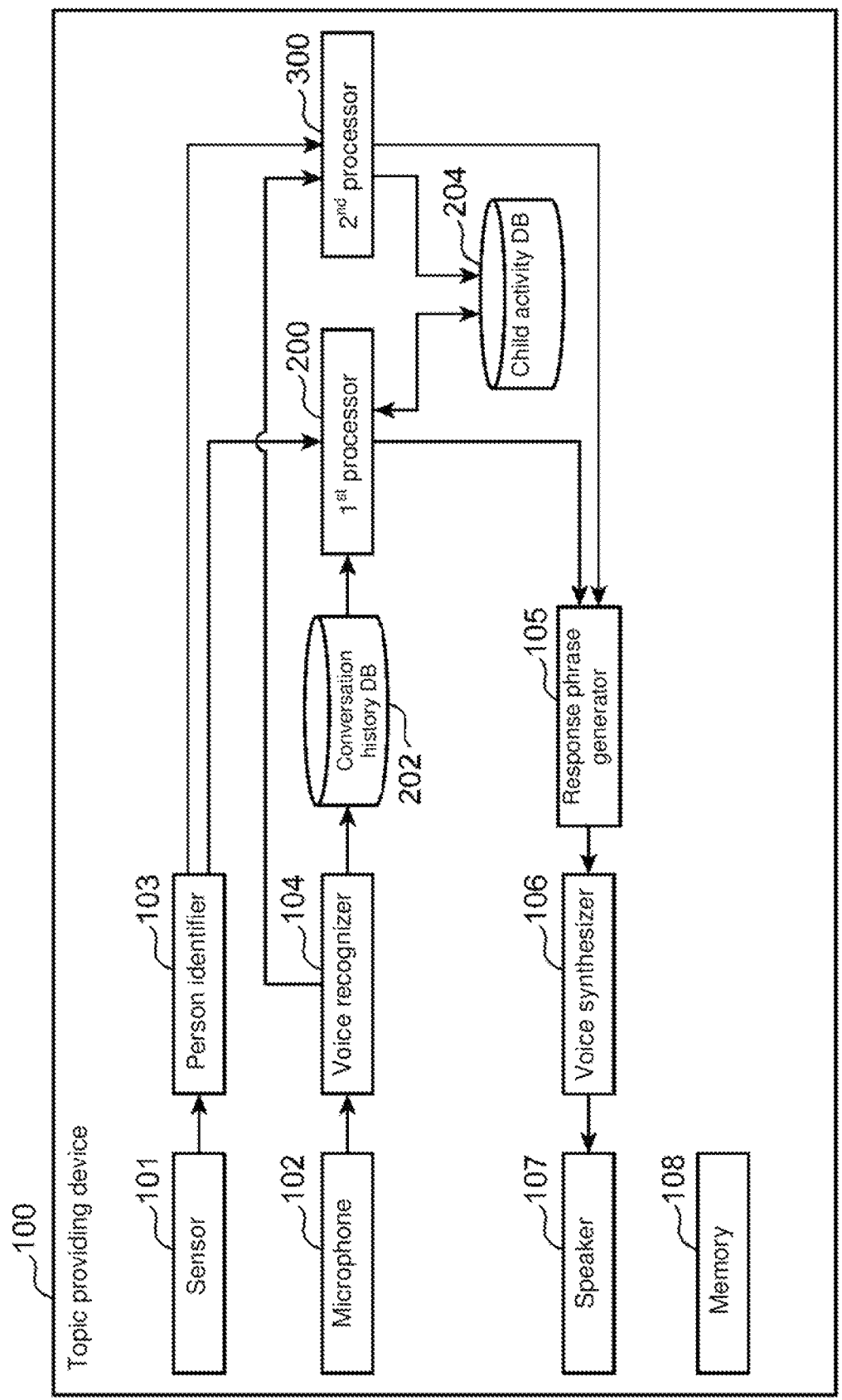
FIG. 5 illustrates an overall configuration of a topic providing device in a first embodiment.
Figure 6:
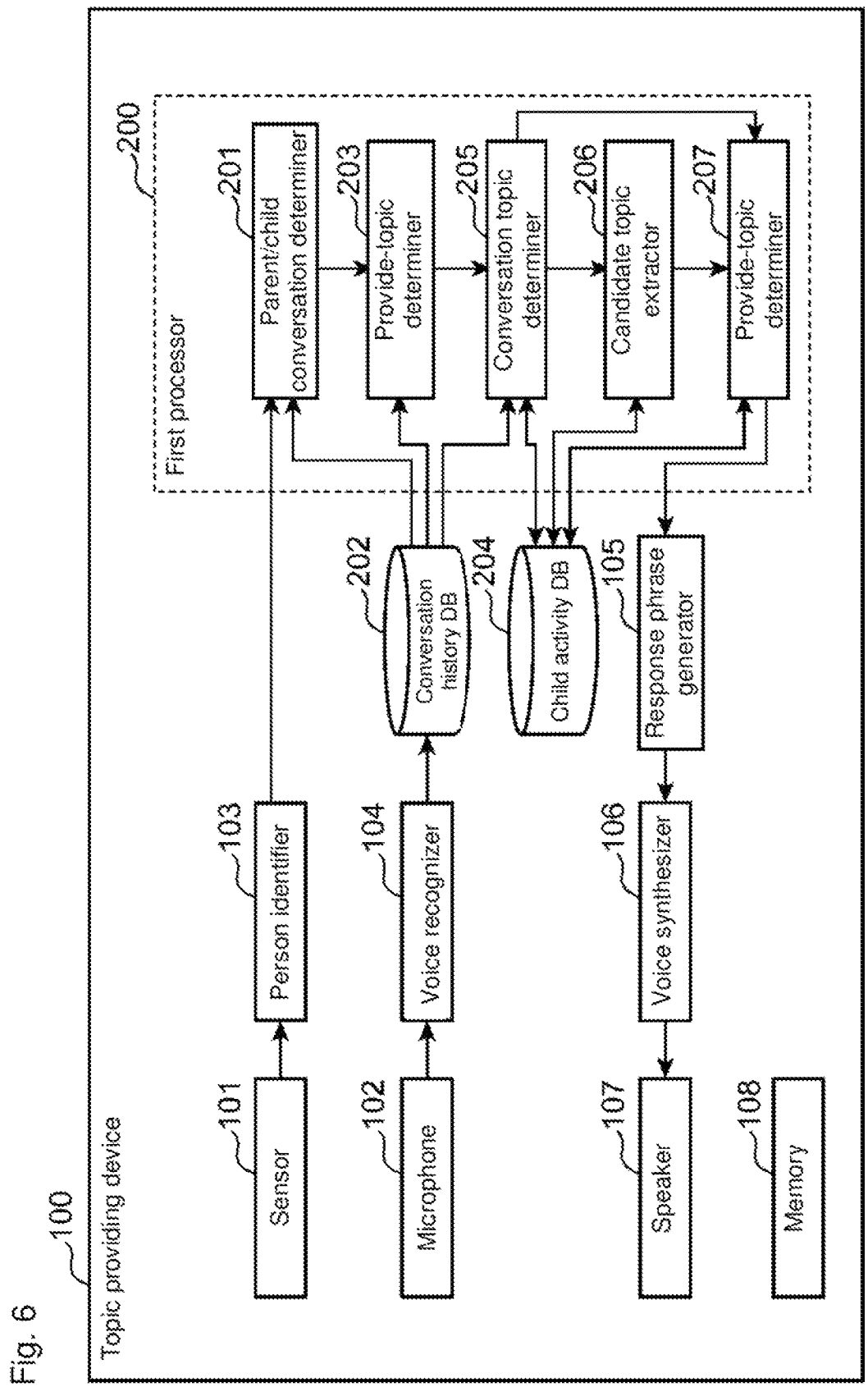
FIG. 6 illustrates a configuration of a first processor of the topic providing device in the first embodiment.

FIG. 5 illustrates an overall configuration of the topic providing device 100 in the first embodiment. A first processor 200 and a second processor 300 are called up at different times on a time line, and therefore are separate components for the sake of convenience. FIG. 6 illustrates a configuration of the first processor 200 of the topic providing device 100 in the first embodiment. The configuration of the second processor 300 of the topic providing device 100 is described in detail in the second embodiment.

The topic providing device 100 depicted in FIGS. 5 and 6 includes a sensor 101, a microphone 102, a person identifier 103, a voice recognizer 104, a response phrase generator 105, a voice synthesizer 106, a speaker 107, a memory 108, the first processor 200, the second processor 300, a conversation history database (DB) 202, and a child activity database (DB) 204. The first processor 200 includes a parent/child conversation determiner 201, a provide-topic determiner 203, a conversation topic determiner 205, a candidate topic extractor 206, and a provided topic determiner 207.

The sensor 101 obtains image data of an area around the topic providing device 100. The sensor 101 may be a camera, for example, and outputs image data that captures an image of a person to the person identifier 103. The sensor 101 may also be a distance sensor, and may capture three-dimensional model data of the person and output this data to the person identifier 103. In other words, the sensor 101 should be capable of obtaining data indicating physical features of individual people.

The microphone 102 obtains audio of the area around the topic providing device 100. The microphone 102 picks up a voice issuing from a user and outputs the voice to the voice recognizer 104.

The memory 108 stores a plurality of image data corresponding to a plurality of users. The plurality of users include the adult and the child. Specifically, the memory 108 stores the plurality of image data capturing constituent members of a family in a house where the topic providing device 100 is deployed. The constituent members of the family may include, for example, a father and mother as parents, and the child, who is a young child. The topic providing device 100 performs voice interaction with the adult (parent) and the child.

The person identifier 103 identifies a person contained in the obtained image data based on the image data obtained by the sensor 101 and the plurality of image data stored in the memory 108, and outputs user information indicating the identified person. The person identifier 103 uses information on a feature point of a face of the person in the image data output by the sensor 101, and information on a feature point of the face of the user in the image data for each specified user stored in the memory 108 ahead of time, and through a person identifying process (such as pattern matching) that is commonly known, the person identifier 103 identifies the person contained in the image data output by the sensor 101. In addition, when an image of a plurality of people is captured in the image data output by the sensor 101, the person identifier 103 may also perform the above-described person identification process on each person in the image data, and may simultaneously output user information for a plurality of users corresponding to the plurality of people. The person identifier 103 outputs the identified user information to the parent/child conversation determiner 201.

The voice recognizer 104 extracts a voice from the audio obtained by the microphone 102, extracts text data corresponding to the voice and a feature value of the voice, and associates the text data with the feature value and records the associated text data and feature value in the conversation history database 202 (first database). The feature value contains a voice-print of a speaker from whom the voice issues.

The voice recognizer 104 first converts analog data collected by the microphone 102 into digital data. For example, the voice recognizer 104 converts the analog voice to digital using pulse code modulation (PCM). By processing the digitized voice data with a voice recognition process that is commonly known using an acoustic model and a language model stored in the memory 108, the voice recognizer 104 detects the audio of the person's speech contained in the audio indicated by the voice data, and converts the voice data to text data reflecting the meaning of the speech. The voice recognizer 104 may also use an acoustic model and language model stored on a cloud server. The acoustic model holds a waveform sample of the audio, and the language model holds word information (how vocabulary is arranged in a predetermined language). When the acoustic model and language model stored on a cloud server are used, the topic providing device 100 transmits digitized voice data to the cloud server, and receives text data that was converted on the cloud server.

During a generation process, attribution information is appended to the text data generated by the voice recognizer 104, the attribution information indicating whether the voice data belongs to the same person based on voice characteristics in the voice data. For example, when two people are present, three sets of voice data A, B, and C are obtained, and the voice data A and B are for speech by a first person and the voice data C is for speech by a second person, the voice recognizer 104 assigns a tag to the voice data A and B using a predetermined method, the tag indicating that both sets of voice data A and B are for speech by the same person (first person), and the voice recognizer 104 assigns a tag to the voice data C indicating that the voice data C is for speech by the second person. The voice recognizer 104 outputs the generated text data to the conversation history database 202.

FIG. 7 illustrates an example of the conversation history database 202 in the first embodiment. As depicted in FIG. 7, the conversation history database 202 associates and logs the text data output by the voice recognizer 104, a timestamp indicating a time at which the text data was logged, and information identifying the speaker of the text data. The conversation history database 202 is used by the parent/child conversation determiner 201, the provide-topic determiner 203, and the conversation topic determiner 205.

The parent/child conversation determiner 201 determines whether the parent (adult) and child are conversing based on the user information and the conversation history database 202. The parent/child conversation determiner 201 determines that adult and the child are conversing when the parent and the child are the identified persons and the feature value contains a plurality of mutually dissimilar feature values.

The parent/child conversation determiner 201 determines whether the plurality of people are the parent and child, and whether the parent and child are conversing. The parent/child conversation determiner 201 determines whether the plurality of people are the parent and child using identification results of the person identifier 103, and determines whether the parent and child are conversing based on the conversation history database 202.

When the user information output by the person identifier 103 indicates one of the parent and child, and the user information indicates the other of the parent and child within a predetermined amount of time, the parent/child conversation determiner 201 determines that the parent and the child are both present at the same time. Alternatively, a plurality of user information may be specified and the parent and the child may both be detected simultaneously. In a case where the user information output by the person identifier 103 is for the parent, for example, when the person identifier 103 outputs the user information for the child within a predetermined amount of time from detecting the parent, the parent/child conversation determiner 201 determines that the parent and the child are both present simultaneously.

In addition, when the parent and child are determined to be present simultaneously, the parent/child conversation determiner 201 references the conversation history database 202 and, when the two people speak within the predetermined amount of time, determines that the parent and child are conversing. When the parent/child conversation determiner 201 references the conversation history database 202 and an elapsed amount of time from a time indicated by the timestamp of the text data when the parent and child are recognized as conversing to a time indicated by the timestamp of the next previous text data is within a predetermined amount of time, the next previous text data is determined to be the speech content of the conversation between the parent and child. Then, when the timestamp of the next previous text data in reverse order is verified and the elapsed time is longer than the predetermined amount of time, the parent/child conversation determiner 201 determines that the timestamp of the text data is a start time indicating a time when the parent and child started conversing. When the parent and child are determined to be conversing, the parent/child conversation determiner 201 records the start time of the parent and child's conversation in the memory 108.

When the determination is made that the parent (adult) and the child are conversing, the provide-topic determiner 203 determines, based on the conversation history database

202, whether there is a need to provide a new topic to the parent and child. When a predetermined key phrase (first key phrase) is contained in the text data, the provide-topic determiner 203 determines that there is a need to provide a new topic to the parent and child. The predetermined key phrase includes wording that indicates the topic.

When the parent/child conversation determiner 201 determines that the parent and child are conversing, the provide-topic determiner 203 determines whether there is a need to provide a topic using the text data of the conversation history database 202. When the provide-topic determiner 203 references the newest text data in the conversation history database 202 and the predetermined key phrase is contained in the text data, the provide-topic determiner 203 determines that there is a need to provide a topic. An example of the predetermined key phrase is a key phrase requesting a topic, such as "Give me a topic." When such a key phrase is contained in the text data, the provide-topic determiner 203 determines that there is a need to provide a topic.

The provide-topic determiner 203 may also determine that there is a need to provide a topic when the parent and child are present and the predetermined amount of time has elapsed after the last text data is recorded in the conversation history database 202. In such a case, when there is a lack of topic while the parent and the child are conversing and there is a period of silence, a new topic is provided.

The child activity database 204 stores the at least one activity name indicating the activity the child was engaged in for a first predetermined period of time. In addition, the child activity database 204 further stores movement amount information indicating an amount of movement corresponding to the activity name, audio level information indicating an audio level corresponding to the activity name, and date information indicating a date corresponding to the activity name. Specifically, the child activity database 204 associates and stores the activity name, the movement amount information, the audio level information, and the date information.

FIG. 8 illustrates an example of the child activity database 204 in the first embodiment. The child activity database 204 stores the activity name indicating details of the child's activity, the movement amount of the child during activity, the audio level of the child during activity, and the date when the child was active. The details of the child's activity are details of the child's play and may include, for example, "playing superhero," "pretending to be a car," "playing with dolls," "book," or "blocks." The movement amount of the child during activity is an indicator of how much the child moved while active. The movement amount information is a value obtained by multiplying a first coefficient by the movement amount. The audio level of the child during activity is an indicator of how much noise the child made while active. The audio level information is a value obtained by multiplying a second coefficient by the audio level. Details relating to a method of creating the child activity database 204 are described in the second embodiment, below.

The conversation topic determiner 205 determines a topic that has already appeared in the conversation between the parent and child. The conversation topic determiner 205 references the start time of the conversation between the parent and child using the memory 108, references a conversation history between the users from the start time to the present using the conversation history database 202, and obtains the text data of the conversation from the start time to the present. In a case where an activity name in the child activity database 204 is used as the key phrase, when a character sequence in the obtained text data matches the key phrase, the conversation topic determiner 205 determines that the matching key phrase is a topic that has already appeared in the conversation. When, for example, the activity name/key phrase is "book" and the text data includes content such as "I read a book about Pinocchio," the character sequence "book" matching the key phrase is present in the text data, and therefore the conversation topic determiner 205 determines that a topic related to "book" has appeared in the conversation.

When the text data logged in the conversation history database 202 is referenced in chronological order, the conversation topic determiner 205 determines that the topic contained in the text data having the newest time is the newest topic of the conversation between the users. Specifically, the conversation topic determiner 205 specifies the newest activity name based on the child activity database 204 (second database). The conversation topic determiner 205 outputs to the candidate topic extractor 206 information indicating the at least one topic that has already appeared in the conversation. In addition, the conversation topic determiner 205 outputs to the provided topic determiner 207 information indicating the newest topic.

When providing a topic is determined to be necessary, the candidate topic extractor 206 extracts at least one candidate topic based on the conversation history database 202 (first database) and the child activity database 204 (second database). The at least one candidate topic corresponds to the at least one activity name in the second database and does not correspond to the at least one activity name included in the text data recorded in the conversation history database 202 (first database). The candidate topic extractor 206 extracts, as the at least one candidate topic, at least one activity name (second activity name) different from the newest activity name and the at least one activity name included in the text data.

The candidate topic extractor 206 extracts, as the at least one candidate topic to provide to the parent and child, the at least one activity name in the child activity database 204. The candidate topic extractor 206 receives from the conversation topic determiner 205 information indicating the topic that has already appeared in the conversation between the users, and excludes the received topic from the at least one candidate topic.

In addition, the candidate topic extractor 206 extracts, as the at least one candidate topic, at least one activity name (second activity name) that is different from the newest activity name and the at least one activity name included in the text data, and that is recorded in a predetermined period of time (second predetermined period of time). The predetermined period of time (second predetermined period of time) is a period of time indicating the current day, for example. The candidate topic extractor 206 references the date information in the child activity database 204 and excludes from the at least one candidate topic any activity name having a date other than the current day. The candidate topic extractor 206 outputs the at least one candidate topic to the provided topic determiner 207.

From the at least one candidate topic, the provided topic determiner 207 selects one topic to provide to the parent (adult) and the child. The provided topic determiner 207 selects a third activity name, as the one topic, from the at least one second activity name based on a first movement amount corresponding to the newest activity name, a first audio level corresponding to the newest activity name, a second movement amount corresponding to the at least one second activity name among the activity names, and a second audio level corresponding to the at least one second activity name. The provided topic determiner 207 selects, as the third activity name, the second activity name having the largest sum calculated according to the following formula:

$$(A-B)^2+(C-D)^2$$

where A represents the first movement amount, B represents the second movement amount, C represents the first audio level, and D represents the second audio level.

Based on the activity data for the child, the provided topic determiner 207 determines which topic to provide from a standpoint of cultivating good habits. The provided topic determiner 207 receives activity data that includes the activity name, movement amount, and audio level of the child's activity from the child activity database 204, receives information indicating the newest topic in the conversation between the users from the conversation topic determiner 205, and receives information indicating the candidate topic from the candidate topic extractor 206. The provided topic determiner 207 plots the activity data for the newest topic and the activity data for the candidate topic on a coordinate plane having the movement amount and the audio level (attributes of the activity data in the child activity database 204) as mutually orthogonal coordinate axes. The provided topic determiner 207 determines, as the provided topic, the candidate topic for the activity data having the greatest relative distance (Euclidean distance) between the coordinates corresponding to the newest topic activity data and the coordinates corresponding to the candidate topic activity data. When the activity data for the newest topic does not include any movement amount or audio level for the current day, the provided topic determiner 207 obtains from the child activity database 204 the movement amount and audio level corresponding to the same activity name performed on a day prior to the current day. In addition, when there is no past movement amount or audio level corresponding to the same activity name, the provided topic determiner 207 takes a predetermined value as the movement amount and audio level of the newest topic. According to the determination results for the provided topic, the provided topic determiner 207 outputs to the response phrase generator 105 the information indicating the topic to be provided.

Figure 9:
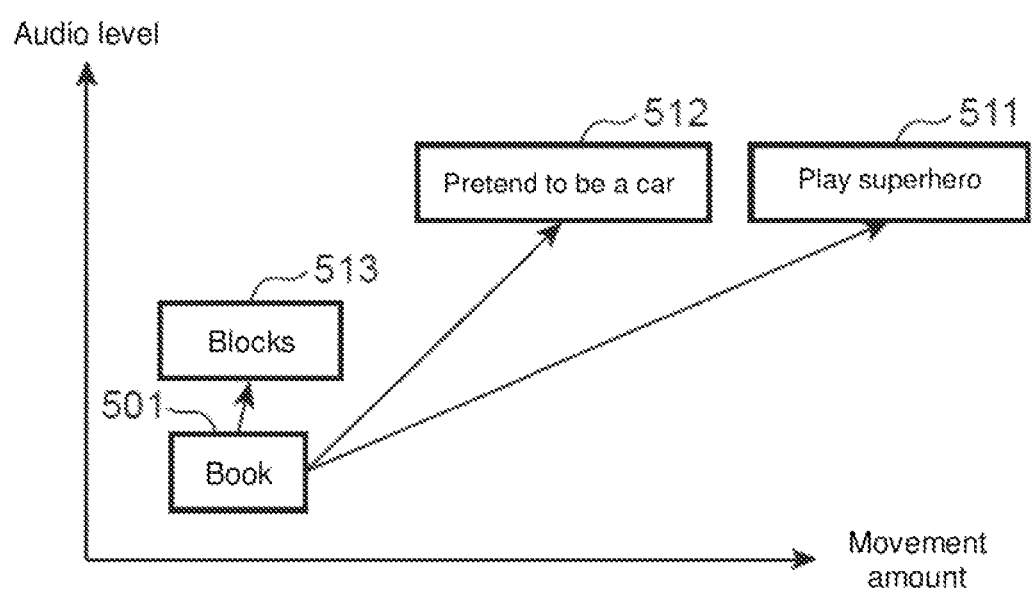
FIG. 9 is an explanatory diagram of a process whereby a provided topic determiner in the first embodiment selects, from among candidate topics, one topic to provide to an adult and a child.

FIG. 9 is an explanatory diagram of a process whereby the provided topic determiner 207 in the first embodiment selects, from among candidate topics, one topic to provide to the adult and the child. In FIG. 9, the horizontal axis indicates the movement amount and the vertical axis indicates the audio level.

In FIG. 9, for example, a newest topic 501 appearing in the conversation is "book," a first candidate topic 511 is "playing superhero," a second candidate topic 512 is "pretending to be a car," and a third candidate topic 513 is "blocks." Activity data for each of the newest topic 501, the first candidate topic 511, the second candidate topic 512, and the third candidate topic 513 is stored in the child activity database 204 depicted in FIG. 8. The movement amount for "book" (the newest topic 501) is 2.1 and the audio level is 1.5. The movement amount for "playing superhero" (the first candidate topic 511) is 8.3 and the audio level is 7.2. Therefore, the Euclidean distance between the newest topic 501 and the first candidate topic 511 is calculated by the following formula:

$$\{(2.1-8.3)^2+(1.5-7.2)^2\}^{1/2}$$

The provided topic determiner 207 calculates the Euclidean distance between the newest topic 501 and the other candidate topics in the same way, and selects as the provided topic to be provided to the adult and the child the candidate topic having the greatest calculated Euclidean distance.

The response phrase generator 105 receives from the provided topic determiner 207 information related to the topic to be provided, and generates, as text data, a response phrase communicating the details of the topic to be provided to the users. For example, when the topic to be provided is "playing superhero," the response phrase generator 105 generates a response phrase saying "You pretended to be a superhero today."

Preferably, the response phrase generator 105 not only includes the activity name, but combines other attributes to generate a response phrase. Specifically, when the movement amount (third movement amount) corresponding to the provided topic (third activity name) is equal to or greater than a first threshold value, based on the child activity database 204, the response phrase generator 105 generates voice data containing a second key phrase. Meanwhile, when the movement amount (third movement amount) corresponding to the provided topic (third activity name) is less than the first threshold value, based on the child activity database 204, the response phrase generator 105 generates voice data containing a third key phrase. At this time, the second key phrase and the third key phrase contain phrasing providing feedback on the child's engagement level in the provided topic (third activity name). The meaning indicated by the second key phrase is substantially the opposite of the meaning indicated by the third key phrase.

Also, when the audio level (third audio level) corresponding to the provided topic (third activity name) is equal to or greater than a first threshold value, based on the child activity database 204, the response phrase generator 105 generates voice data containing the second key phrase. Meanwhile, when the audio level (third audio level) corresponding to the provided topic (third activity name) is less than the first threshold value, based on the child activity database 204, the response phrase generator 105 generates voice data containing the third key phrase.

For example, when the topic to be provided is "playing superhero," the response phrase generator 105 may reference a magnitude of the movement amount or audio level and generate a response phrase. For example, when the movement amount is greater than a predetermined value, the response phrase generator 105 may generate a response phrase saying "You pretended to be a superhero today, and you moved around a lot!" and when the audio level is greater than a predetermined value, the response phrase generator 105 may generate a response phrase saying "You pretended to be a superhero today, and you got so loud!" An activity status of the child has been added to these response phrases. Alternatively, the response phrase generator 105 may generate a response phrase to which has been added an activity status corresponding to both the movement amount and audio level attributes, as in a response phrase saying "You pretended to be a superhero today, and you moved around a lot and made a lot of noise!" The response phrase generator 105 outputs text data reflecting the generated response phrase to the voice synthesizer 106.

The voice synthesizer 106 generates voice data that includes the one topic to be provided to the adult and the child, selected from the at least one candidate topic. The voice synthesizer 106 receives from the response phrase generator 105 the text data reflecting the response phrase and converts the text data reflecting the response phrase into voice data by executing a known voice synthesis process. The voice synthesizer 106 outputs the converted voice data to the speaker 107.

The speaker 107 outputs the voice data generated by the voice synthesizer 106. The speaker 107 outputs the voice data received from the voice synthesizer 106.

In the first embodiment, all or a portion of the configuration other than the sensor 101, the microphone 102, and the speaker 107 may be provided on a server connected via a network to the topic providing device 100 so as to be capable of two-way communication.

Figure 10:
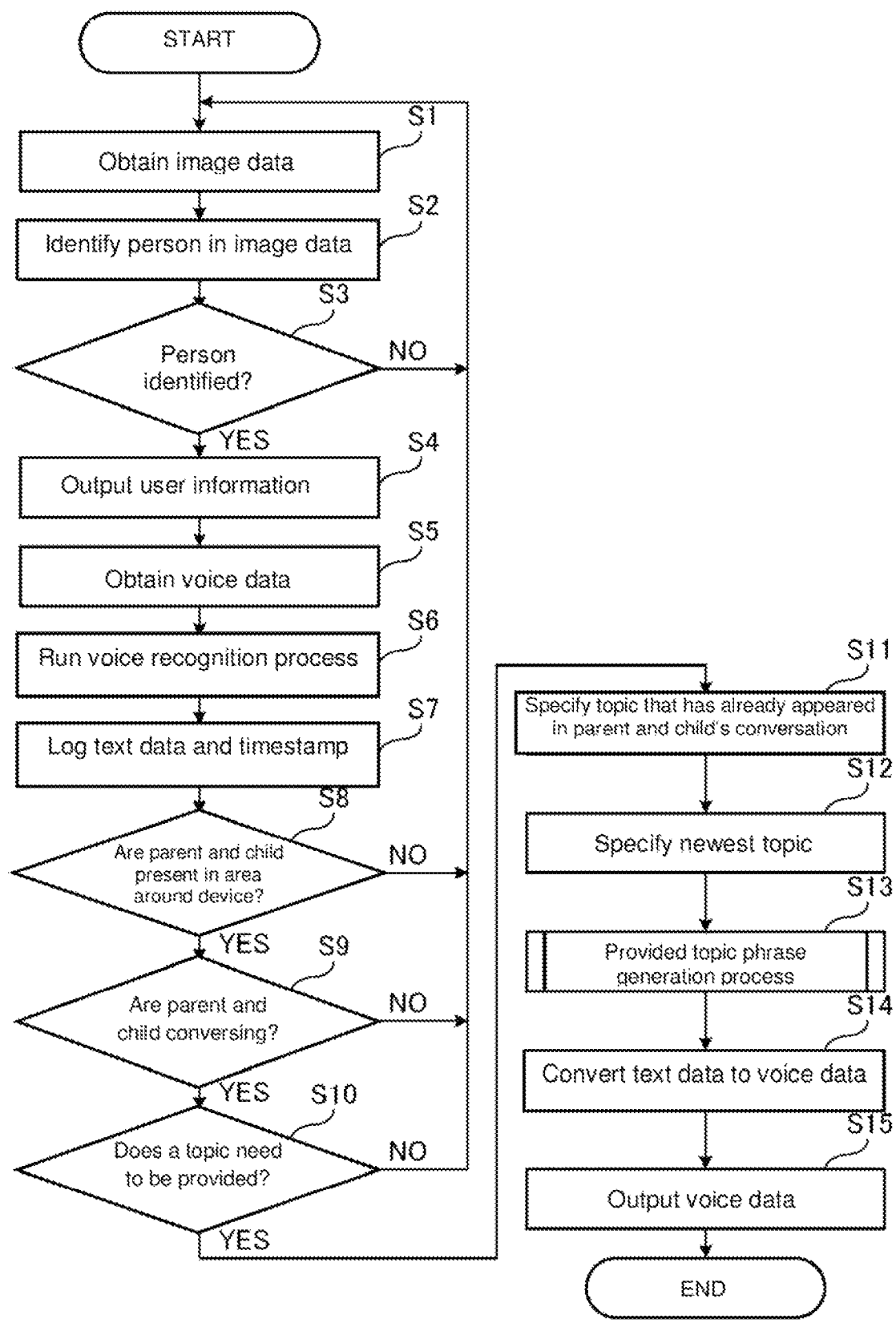
FIG. 10 is a flowchart illustrating an example of a topic providing process of the topic providing device in the first embodiment.

Hereafter, with reference to FIG. 10, a description is given of a topic providing process in the first embodiment that determines whether the users having a conversation are the parent and child, determines whether to provide a topic, selects a topic to be provided, and provides the topic.

FIG. 10 is a flowchart illustrating an example of the topic providing process of the topic providing device 100 in the first embodiment.

First, the sensor 101 obtains, as input information, the image data capturing the plurality of users (step S1). The sensor 101 outputs the obtained image data to the person identifier 103.

Next, the person identifier 103 references the user information stored in the memory 108 and executes a person identification process on the image data output from the sensor 101, and thereby identifies a person contained in the image data (step S2).

Next, the person identifier 103 determines whether the person contained in the image data has been identified (step S3). In this example, when a determination is made that the person has been identified (YES in step S3), the person identifier 103 outputs to the parent/child conversation determiner 201 the user information corresponding to the person contained in the image data (step S4).

However, when the person contained in the image data does not correspond to the user information stored in the memory 108 and a determination is made that the person has not been identified (NO in step S3), the process returns to step S1.

Next, the microphone 102 obtains, as the input information, the voice data reflecting the audio spoken by the plurality of users (step S5). The microphone 102 outputs the obtained voice data to the voice recognizer 104.

Next, the voice recognizer 104 executes a voice recognition process on the voice data output from the microphone 102 and converts the speech content of the person contained in the voice data into text data (step S6).

Next, the voice recognizer 104 appends to the text data attribute information indicating whether the speaker is the same person, using the voice characteristics of the voice data extracted in the voice recognition processing step, and logs the text data and timestamp in the conversation history database 202 (step S7).

Next, the parent/child conversation determiner 201 determines whether the parent and child are present in the area around the topic providing device 100, based on the user information output by the person identifier 103 (step S8). By performing the processes of steps S1 to S7 a plurality of times, a determination can be made as to whether there is a conversation between the parent and child. When only one of either the user information indicating the parent or the user information indicating the child is output within the predetermined amount of time, the parent/child conversation determiner 201 determines that the parent and child are not present in the area around the topic providing device 100, and when both the user information indicating the parent and the user information indicating the child are output within the predetermined amount of time, the parent/child conversation determiner 201 determines that the parent and child are present in the area around the topic providing device 100. In this example, when the parent and child are determined to not be present in the area around the topic providing device 100 (NO in step S8), the process returns to step S1.

However, when the parent and child are determined to be present in the area around the topic providing device 100 (YES in step S8), the parent/child conversation determiner 201 references the conversation history database 202 and determines whether the parent and child are conversing (step S9). The parent/child conversation determiner 201 references the conversation history database 202 and, when two different people speak within the predetermined amount of time, i.e., when text data corresponding to two different speakers is present in the conversation history database 202 within a predetermined amount of time, the parent/child conversation determiner 201 determines that the parent and child are conversing. In addition, the parent/child conversation determiner 201 references the conversation history database 202 and, when only one person speaks within the predetermined amount of time, i.e., when text data corresponding to only one speaker is present in the conversation history database 202 within the predetermined amount of time, or when no one speaks within the predetermined amount of time, i.e., when there is no text data in the conversation history database 202 within the predetermined amount of time, the parent/child conversation determiner 201 determines that the parent and child are not conversing. In this example, when the parent and child are determined to not be conversing (NO in step S9), the process returns to step S1.

When the parent/child conversation determiner 201 references the conversation history database 202 and an elapsed amount of time from a time indicated by the timestamp of the text data recognized when the parent and child are conversing to a time indicated by the timestamp of the next previous text data is within a predetermined amount of time, the next previous text data is determined to be the speech content of the conversation between the parent and child. Then, by determining the next previous text data in order, the parent/child conversation determiner 201 specifies the start time indicating the time when the parent and child started conversing. When the parent and child are determined to be conversing, the parent/child conversation determiner 201 records in the memory 108 the start time indicating the time when the parent and child started conversing.

However, when the parent and child are determined to be conversing (YES in step S9), the provide-topic determiner 203 references the newest text data from the conversation history database 202 and determines whether a topic needs to be provided (step S10). When a predetermined key phrase is contained in the newest text data, the provide-topic determiner 203 determines that there is a need to provide a topic. The predetermined key phrase may be, for example, a phrase seeking to have a topic provided, such as "Give me a topic." When the predetermined key phrase is not contained in the newest text data, the provide-topic determiner 203 determines that there is no need to provide a topic. In this example, when providing a topic is determined to not be necessary (NO in step S10), the process returns to step S1.

However, when providing the topic is determined to be necessary (YES in step S10), the conversation topic determiner 205 specifies a topic that has appeared in the conversation between the parent and child (step S11). The conversation topic determiner 205 reads the start time of the conversation between the parent and child saved in the memory 108, and obtains the text data of the conversation history database 202 from the start time to the present time. The conversation topic determiner 205 searches the obtained text data, using an activity name of the child's activity that is in the child activity database 204 as the key phrase. When the text data includes at least one word matching the key phrase, the conversation topic determiner 205 specifies the activity name corresponding to the key phrase as a previously covered topic that has already appeared in the conversation between the parent and child.

Next, the conversation topic determiner 205 specifies the newest topic from among the topics that have already appeared in the conversation between the parent and child (step S12). The conversation topic determiner 205 specifies, as the newest topic, a key phrase in the newest text data among the text data that includes a key phrase corresponding to an activity name of the child's activity that is in the child activity database 204.

Next, the candidate topic extractor 206, the provided topic determiner 207, and the response phrase generator 105 execute a provided topic phrase generation process generating a response phrase for providing the topic to the parent and child (step S13). Details of the provided topic phrase generation process are given below with reference to FIG. 11.

Next, the voice synthesizer 106 converts the text data reflecting the response phrase for the topic to be provided into voice data (step S14).

Next, the speaker 107 outputs the voice data (step S15).

Next, the provided topic phrase generation process of step S13 in FIG. 10 is described with reference to FIG. 11.

Figure 11:
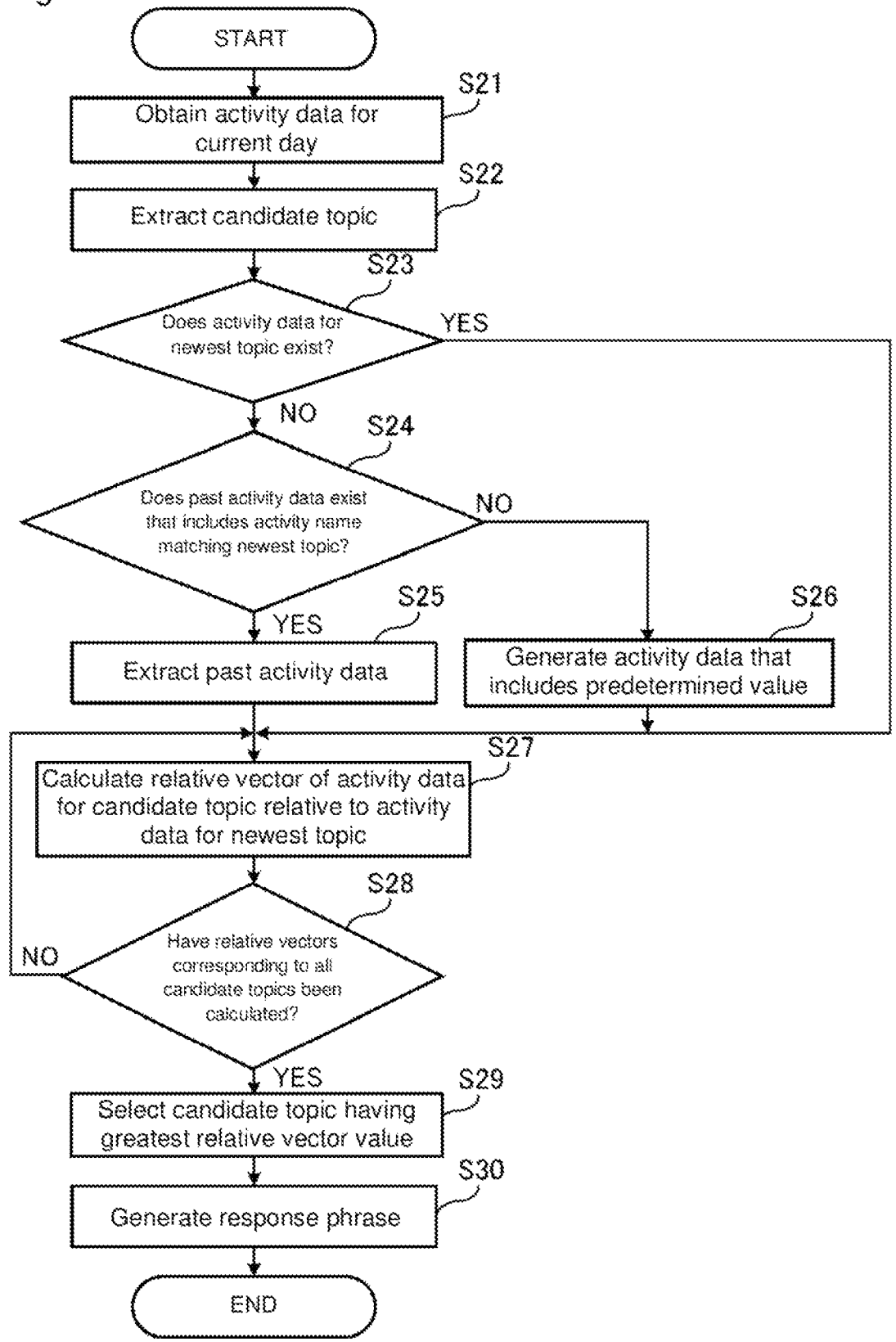
FIG. 11 is a flowchart illustrating a provided topic sentence generation process in step S13 of FIG. 10.

FIG. 11 is a flowchart illustrating the provided topic phrase generation process in step S13 of FIG. 10.

First, the candidate topic extractor 206 obtains activity data for the child for the current day from the child activity database 204 (step S21).

Next, the candidate topic extractor 206 extracts, as the candidate topic, at least one activity name from the activity names performed that day in the activity data for the child, excluding an activity name that matches a topic that has appeared in the conversation between the parent and child as determined by the conversation topic determiner 205 (step S22).

Next, the provided topic determiner 207 determines whether activity data corresponding to the newest topic, as determined by the conversation topic determiner 205, is present in the activity data for the current day (step S23). In this example, when the activity data corresponding to the newest topic is determined to be present (YES in step S23), the process proceeds to step S27.

However, when the activity data corresponding to the newest topic is determined to not be present (NO in step S23), the provided topic determiner 207 references past activity data for the child in the child activity database 204, and determines whether any activity data that contains the activity name matching the newest topic is present in the past data (step S24). In this example, when the activity data that contains the activity name matching the newest topic is determined to be present in the past data (YES in step S24), the provided topic determiner 207 extracts from the child activity database 204 the past activity data that contains the activity name matching the newest topic (step S25).

However, when the activity data that contains the activity name matching the newest topic is determined to not be present in the past data (NO in step S24), the provided topic determiner 207 generates, as the activity data for the newest topic, activity data that contains predetermined values (pre-determined movement amount and predetermined audio level) pre-stored in the memory 108 (step S26).

Next, the provided topic determiner 207 calculates a relative vector of the activity data for the candidate topic relative to the activity data for the newest topic, on a coordinate plane having the movement amount and audio level in the activity data as respective coordinate axes (step S27).

Next, the provided topic determiner 207 determines whether the relative vectors corresponding to all the extracted candidate topics have been calculated (step S28). In this example, when a determination is made that the relative vectors corresponding to all the candidate topics have not been calculated (NO in step S28), the process returns to step S27.

However, when a determination is made that the relative vectors corresponding to all the candidate topics have been calculated (YES in step S28), the provided topic determiner 207 selects, as the provided topic, a candidate topic having the greatest relative vector value (Euclidean distance) (step S29).

Next, the response phrase generator 105 generates the response phrase based on the activity data of the provided topic selected by the provided topic determiner 207 (step S30). The response phrase generator 105 generates a response phrase in accordance with the activity name corresponding to the provided topic and with the movement amount and/or audio level contained in the activity data for the provided topic.

Accordingly, based on the conversation history database 202, where the text data indicating the conversation between the adult and the child is stored, and the child activity database 204, where the activity name indicating the activity the child was engaged in for the first predetermined period of time is stored, at least one candidate topic is extracted that corresponds to the at least one activity name in the second database and does not correspond to the activity name included in the text data recorded in the conversation history database 202, and the one topic to provide to the adult and the child is selected from the at least one candidate topic. Therefore, a topic corresponding to the details of the child's activity can be provided, and a topic that is easy for the child to discuss can be provided.

Second Embodiment

In a second embodiment, a process of the topic providing device 100 generating the child activity database 204 is described.

Figure 12:
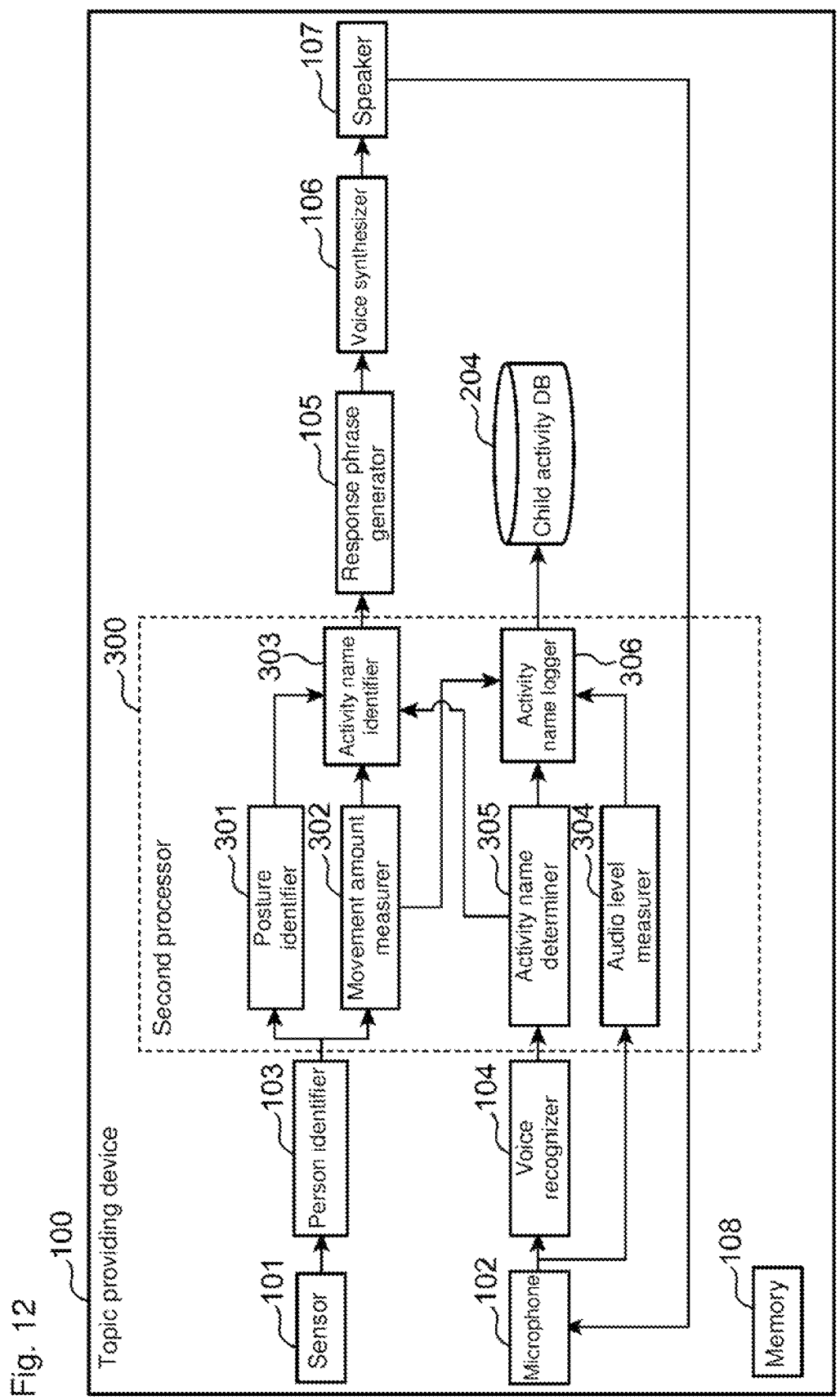
FIG. 12 illustrates a configuration of a second processor of a topic providing device in a second embodiment.

FIG. 12 illustrates a configuration of the second processor 300 of the topic providing device 100 in the second embodiment. In the following description, in order to simplify the description, identical reference numerals are assigned to configurations similar to those in the first embodiment and a description thereof is omitted.

The second processor 300 depicted in FIG. 12 includes a posture identifier 301, a movement amount measurer 302, an activity name identifier 303, an audio level measurer 304, an activity name determiner 305, and an activity name logger 306. The second embodiment includes a process where the speaker 107 outputs audio that addresses a question to the child and the microphone 102 obtains response audio of the child. Depending on the content of the child's response, the above-noted process may be repeated.

The sensor 101 obtains the image data of the area around the topic providing device 100, and distance data indicating a distance from the sensor 101 to an object, including a person, present in the area around the topic providing device 100. The sensor 101 may be a stereo camera or distance sensor, for example, and may obtain the image data as well as distance data for the child in a three-dimensional space. The sensor 101 outputs the obtained image data and distance data to the person identifier 103.

As in the first embodiment, the person identifier 103 identifies a person contained in the obtained image data based on the image data obtained by the sensor 101 and the image data corresponding to the user stored in the memory 108, and outputs the user information indicating the identified person. The person identifier 103 outputs the user information indicating the identified person and the distance data obtained from the sensor 101 to the posture identifier 301 and the movement amount measurer 302.

When the person indicated by the user information is the child, the posture identifier 301 identifies the posture of the child based on the image data obtained from the sensor 101, the distance data obtained from the sensor 101, and the kinetic template data that is stored in the memory 108 and indicates the three-dimensional frame position of a human body in various postures, and outputs the posture information indicating the identified posture of the child.

The posture identifier 301 identifies the posture of the child based on the image data and the distance data in the three-dimensional space. The posture identifier 301 identifies a status of the posture from the posture (position) of each part of the person. The word "part" refers to constituent elements of a multi-jointed object, such as a head, abdomen, arm, leg, and the like. From the status of each part, "standing," "sitting," "bent," "walking," "running," "lying down," and the like are defined ahead of time in the memory 108 as the posture status.

Taking the status of each part as an element, the posture identifier 301 identifies the status of the posture from the status of each part. For example, when the posture of a leg is perpendicular to the ground, the posture status is an element satisfying a condition of "standing." When the posture of the leg is parallel to the ground, the posture status is an element satisfying a condition of "sitting" or "lying down." When the postures of both legs are perpendicular to the ground and the posture of the abdomen is perpendicular to the ground, for example, the posture status is an element satisfying a condition of "standing." Using a known posture identification technique, such as matching the distance data obtained from the sensor 101 and the kinetic template of the child stored in the memory 108 ahead of time, the posture identifier 301 takes a predefined posture status as an identification result, and outputs the identified posture status to the activity name identifier 303.

When the person indicated by the user information is the child, the movement amount measurer 302 calculates, as the movement amount, the amount of change in the position of the specified part of the child over the first predetermined period of time, based on the image data obtained from the sensor 101, the distance data obtained from the sensor 101, and the kinetic template data stored in the memory 108, and outputs the movement amount information indicating the movement amount. In addition, the movement amount measurer 302 calculates, as the movement amount, an average value of the amount of change in a second predetermined period of time that includes the first predetermined period of time.

The movement amount measurer 302 measures the movement amount of the child based on the image data and the distance data in the three-dimensional space. The movement amount tracks the parts of the person using skeleton tracking or the like and is defined as a time average of an amount of change of each part in three-dimensional space. For example, when a hand is present at coordinates $(x_0, y_0, z_0)$ in the three-dimensional space, the amount of change to coordinates $(x_1, y_1, z_1)$ where the hand is present after a predetermined amount of time is expressed by $\{(x_0-x_1)^2+(y_0-y_1)^2+(z_0-z_1)^2\}^{1/2}$. The movement amount measurer 302 calculates, as the movement amount, a value obtained by summing the amount of change of the part of the person in the predetermined amount of time, and dividing the sum of the amount of change by the predetermined amount of time. The movement amount measurer 302 outputs the calculated movement amount to the activity name identifier 303 and the activity name logger 306.

The activity name identifier 303 identifies the activity name of the activity the child is currently performing based on the posture information, the movement amount information, and a table indicating a correspondence between an activity name that the child performs stored in the memory 108, the movement amount corresponding to the activity name, and the posture of the child corresponding to the activity name, or based on a noun contained in the extracted voice, and outputs the activity information indicating the identified activity name.

The activity name identifier 303 identifies the activity name (activity details) of the child using the posture status and the movement amount of each part defined in the memory 108. Alternatively, the activity name identifier 303 identifies the activity name of the child's activity from the speech content of the child. The identification result may also give a plurality of activity names as candidates. The activity name is identified using the posture status and a result where a status higher or lower than the predetermined movement amount of each part continues for a predetermined amount of time.

FIG. 13 illustrates a table used when the activity name identifier 303 identifies an activity name in the second embodiment, the table associating the activity name with a posture status and a movement amount of various parts of a human body. For example, when the movement amount of each part is measured continuously for five minutes and the posture status is identified, the activity name identifier 303 defines, as the identification result, the activity name for which the movement amount of each part and the posture status meet the conditions indicated in FIG. 13.

For example, when the measured movement amount of the head is 2.0, the measured movement amount of the abdomen is 2.5, the measured movement amount of the arm is 2.5, the measured movement amount of the leg is 0, and the identified posture status is "sitting," the activity name identifier 303 identifies "book" as the activity name, "book" fulfilling the conditions of the movement amount of the head being "3.0 or less," the movement amount of the abdomen being "3.0 or less," the movement amount of the arm being "3.0 or less," and the posture status being "sitting."

In addition, for example, when the measured movement amount of the head is 8.5, the measured movement amount of the abdomen is 8.0, the measured movement amount of the arm is 8.2, the measured movement amount of the leg is 8.2, and the identified posture status is "walking," the activity name identifier 303 identifies "playing superhero" and "dancing" as the two activity names, "playing superhero" fulfilling the conditions of the movement amount of the head being "8.0 or more," the movement amount of the abdomen being "8.0 or more," the movement amount of the arm being "8.0 or more," the movement amount of the leg being "8.0," and the posture status being "walking," and "dancing" fulfilling the conditions of the movement amount of the head being "7.0 or more," the movement amount of the abdomen being "7.0 or more," the movement amount of the arm being "7.0 or more," and the posture status being "walking." When there are a plurality of activity name candidates, the activity name identifier 303 indiscriminately selects one candidate.

The activity name identifier 303 assigns a verb to the identified activity name and outputs the result to the response phrase generator 105. For example, when the identification result is "book," the activity name identifier 303 outputs "read a book" to the response phrase generator 105.

The response phrase generator 105 generates text data in which the identification result obtained from the activity name identifier 303 has been converted to a question. For example, when the identification result is "read a book," the response phrase generator 105 generates text data saying "Are you reading a book?" In addition, for example, when the identification result is "play superhero," the response phrase generator 105 generates text data saying "Are you playing superhero?" The response phrase generator 105 outputs the generated text data to the voice synthesizer 106.

The voice synthesizer 106 converts the text data received from the response phrase generator 105 into voice data and outputs the voice data to the speaker 107. The voice synthesizer 106 generates voice data (first voice data) containing the key phrase corresponding to the activity name indicated by the activity information. The voice data is expressed in the form of a question. In addition, the voice data contains text data inquiring whether the child is performing the identified activity. The speaker 107 outputs the voice data (first voice data).

The microphone 102 obtains audio of the area around the topic providing device 100. While the person identifier 103 is detecting the child, the microphone 102 continuously obtains background noise in the area, and outputs the obtained background noise to the audio level measurer 304. In addition, the microphone 102 obtains the response audio of the child responding to the question output from the speaker 107, and outputs the obtained response audio to the voice recognizer 104. The microphone 102 cannot recognize the difference between the speech of the child and the background noise, and therefore the audio output to the voice recognizer 104 and the audio level measurer 304 is the same.

The voice recognizer 104 performs the same process as in the first embodiment, the response audio of the child obtained from the microphone 102 is converted to text data, and is output to the activity name determiner 305. The voice recognizer 104 recognizes meaning in a voice extracted from the audio obtained by the microphone 102 after the voice data (first voice data) is output from the speaker 107, and outputs text data reflecting the recognized meaning of the voice.

The audio level measurer 304 extracts a voice from the audio obtained by the microphone 102, and outputs the audio level information indicating the audio level of the extracted voice. In addition, the audio level measurer 304 outputs, as the audio level information, an average value of the audio level of the voice extracted during the second predetermined period of time, which includes the first predetermined period of time. The audio level measurer 304 measures the magnitude (audio level) of the audio obtained from the microphone 102 using a known noise measurement process. The magnitude of the audio is expressed by a magnitude of acoustic pressure. The audio level measurer 304 outputs the measured audio level to the activity name logger 306.

The activity name determiner 305 determines the activity name using the response content of the child. The activity name determiner 305 determines whether an affirmative word is contained in the text data from the voice recognizer 104. In addition, when the activity name determiner 305 determines that the text data does not contain an affirmative word, the activity name determiner 305 determines whether the text data contains a negation.

The activity name determiner 305 analyzes each word in the response content of the child, and determines whether the word indicates an affirmative meaning, a negative meaning, or some other meaning. When the response content of the child to the question output as speech by the speaker 107 has an affirmative meaning, such as "Yeah" or "I am," the activity name determiner 305 determines that the activity name identified by the activity name identifier 303 is the activity name of the child's activity. In addition, when the response content of the child has a negative meaning or is content signifying a different activity name, the activity name determiner 305 determines that the activity name of the child's activity is unclear or that the child is not engaged in an activity.

For example, when the speaker 107 outputs voice data for the question "Are you reading a book?" and the child speaks response audio saying "Yeah, I'm reading a book," the activity name determiner 305 determines that the activity name is "book" based on the speech of "Yeah" having an affirmative meaning. In addition, when the speaker 107 outputs voice data for the question "What are you doing?" and the child speaks response audio saying "I'm playing superhero," which is a phrase that is neither affirmative nor negative, the activity name determiner 305 determines that the activity name of the child's activity cannot be specified. Also, when the child gives response audio saying "I'm not doing anything," the activity name determiner 305 determines that the child is not performing any activity. Also, when the child gives no response audio for an extended amount of time, or when the child gives no response audio even when the topic providing device 100 inquires multiple times, the activity name determiner 305 determines that the child is not performing any activity.

When the activity name of the child's activity is specified, the activity name determiner 305 outputs the specified activity name to the activity name logger 306. When the activity name of the child's activity cannot be specified, the activity name determiner 305 outputs to the activity name identifier 303 text data indicating the response content of the child in which each word was analyzed.

When the activity name determiner 305 determines that the text data does not contain a negation, and a determination is made as to whether the text data contains a noun, when the text data is determined to contain a noun, the activity name identifier 303 identifies that the noun indicates the activity name of the activity that the child is currently performing.

When the activity name of the child's activity is not specified by the activity name determiner 305, the activity name identifier 303 identifies the activity name based on the text data indicating the response content of the child. The activity name identifier 303 extracts a noun or noun phrase from the text data indicating the response content of the child in which each word was analyzed. The activity name identifier 303 identifies the extracted noun as the activity name of the activity the child is performing. For example, when the response content of the child is "I'm playing superhero," the activity name identifier 303 extracts the noun "superhero." The activity name identifier 303 assigns a verb to the identification result and outputs the phrase to the response phrase generator 105.

Also, in some cases the activity name cannot be identified, such as when the response content of the child is "No," or when a noun or noun phrase is not contained in the text data indicating the response content. In such examples, the activity name identifier 303 treats the text data inquiring as to the activity of the child ("What are you doing?") as the identification result. In such a case, when the activity name identifier 303 determines that the text data does not contain a noun, the response phrase generator 105 generates voice data (second voice data) to inquire as to what the child is doing. The speaker 107 outputs the voice data (second voice data).

When the activity name determiner 305 determines that the text data contains an affirmative word, the activity name logger 306 associates the activity information, the movement amount information, and the audio level information, and records the associated information in the child activity database 204. The activity name logger 306 logs the activity name, the movement amount, the audio level, and the activity date of the child's activity in the child activity database 204. The activity name logger 306 converts the movement amount and audio level to a score of 0.0 to 10.0 and logs the score in the child activity database 204. The score is a value aligning the scales of two or more values having different units, such as the movement amount and the audio level, with a predetermined method. For example, the data of the movement amount and audio level associated with the various activities of the child may be obtained ahead of time, the minimum values of each set of obtained data may be defined as 0.0, and the maximum values may be defined as 10.0. The activity name logger 306 logs the converted movement amount, the converted audio level, the activity name determined by the activity name determiner 305, and the activity date in the child activity database 204. The activity name logger 306 records the normalized movement amount in the child activity database 204 as the movement amount information and records the normalized audio level in the child activity database 204 as the audio level information. Specifically, the activity name logger 306 records the movement amount multiplied by a first coefficient in the child activity database 204 as the movement amount information, and records the audio level multiplied by a second coefficient in the child activity database 204 as the audio level information. The first coefficient is a value obtained by dividing a predetermined first constant by a second constant, and the second coefficient is a value obtained by dividing a predetermined third constant by the second constant.

The activity name logger 306 logs the average value of the movement amount of each part of the child's body in the child activity database 204 as the movement amount corresponding to the activity name. In addition, the activity name logger 306 may log the maximum value or the minimum value of the movement amount of each part of the child's body in the child activity database 204 as the movement amount corresponding to the activity name.

In the second embodiment, all or a portion of the configuration other than the sensor 101, the microphone 102, and the speaker 107 may be provided on the server connected via the network to the topic providing device 100 so as to be capable of two-way communication.

Hereafter, in the second embodiment, the logging process of logging the activity name, the movement amount information, the audio level information, and the date of the child's activity in the child activity database 204 is described with reference to FIGS. 14 and 15.

Figure 14:
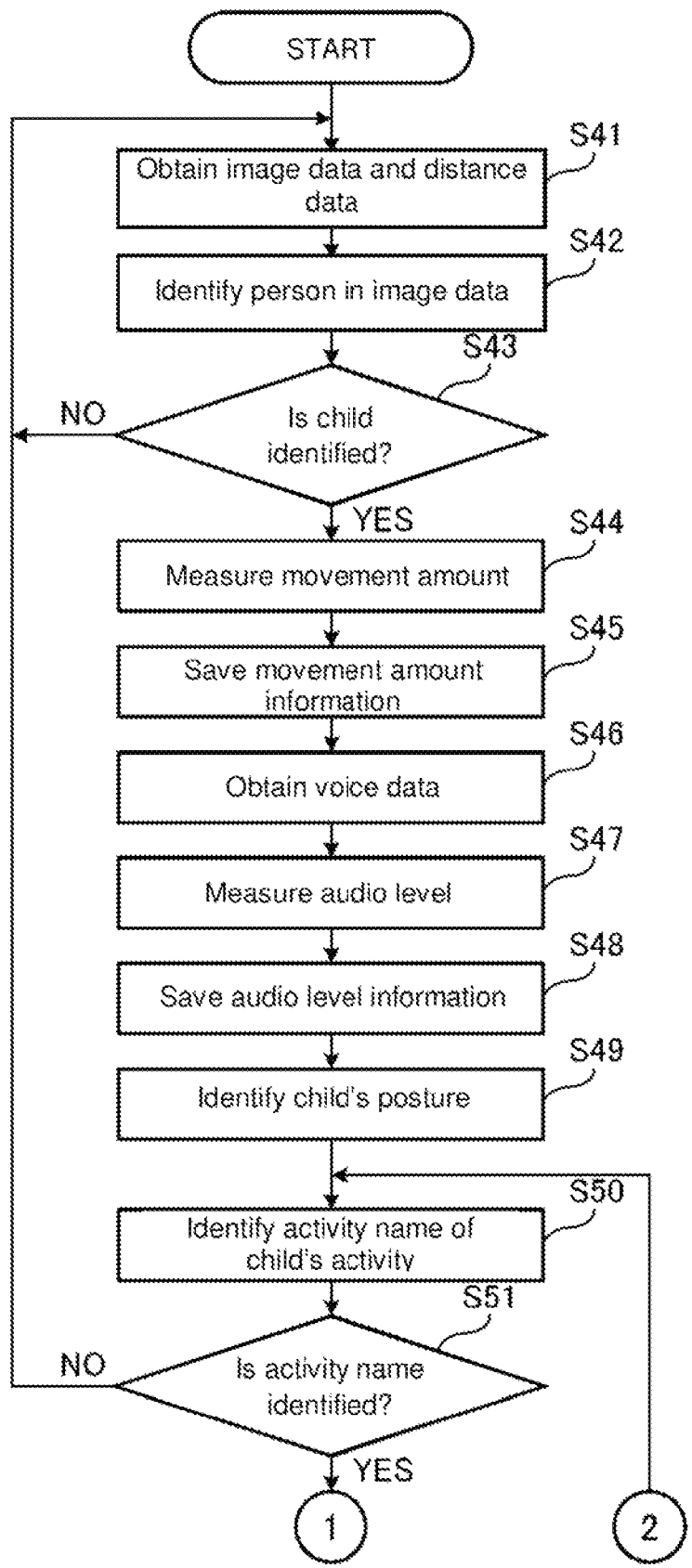
FIG. 14 is a first flowchart illustrating an example of a logging process performed by the topic providing device in the second embodiment.
Figure 15:
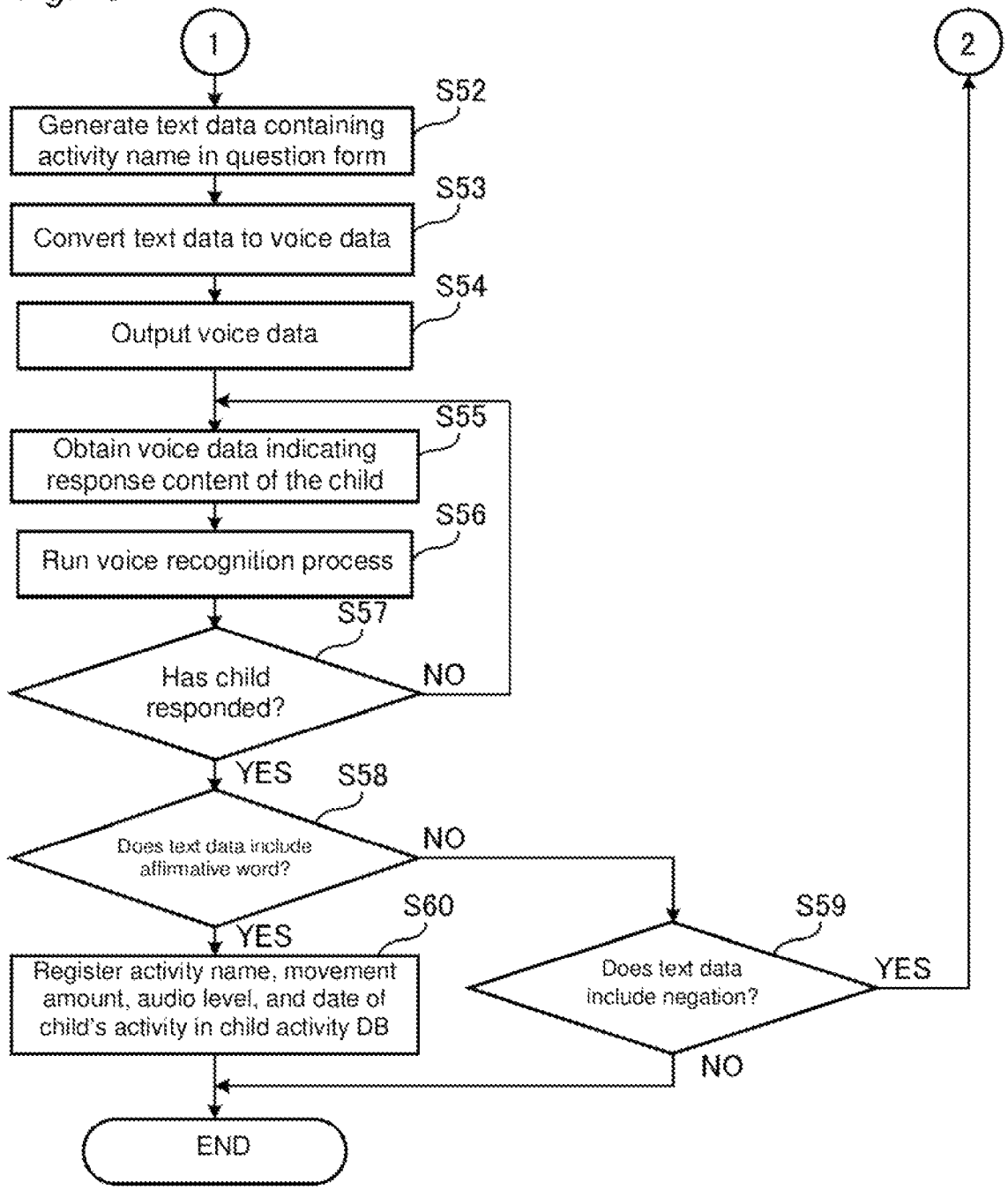
FIG. 15 is a second flowchart illustrating an example of the logging process performed by the topic providing device in the second embodiment.

FIG. 14 is a first flowchart illustrating an example of the logging process performed by the topic providing device 100 in the second embodiment. FIG. 15 is a second flowchart illustrating an example of the logging process performed by the topic providing device 100 in the second embodiment.

First, the sensor 101 obtains the image data and the three-dimensional distance data (step S41). The sensor 101 outputs the obtained image data to the person identifier 103. The sensor 101 also outputs the obtained image data and three-dimensional distance data to the posture identifier 301.

Next, the person identifier 103 references the user information stored in the memory 108 and executes the person identification process on the image data output from the sensor 101, and thereby identifies a person contained in the image data (step S42).

Next, the person identifier 103 determines whether a child contained in the image data has been identified (step S43). In this example, when the child is not identified (NO in step S43), the process returns to step S41 and the process of steps S41 to S43 are repeated until the child is detected.

However, when a determination is made that the child has been identified (YES in step 43), the movement amount measurer 302 tracks the movement of the child and measures, as the movement amount, an amount of change in the tracked three-dimensional distance data of the child (step S44). The movement amount measurer 302 splits the child's overall body into four parts (hands, legs, abdomen, and head) and measures the movement amount of each part.

Next, the movement amount measurer 302 saves the movement amount information indicating the measured movement amount of each part in the memory 108 (step S45).

Next, the microphone 102 obtains the voice data associated with the activity of the child (step S46). The microphone 102 outputs the obtained voice data to the audio level measurer 304.

Next, the audio level measurer 304 measures the audio level of the obtained voice data (step S47).

Next, the audio level measurer 304 saves the audio level information indicating the measured audio level in the memory 108 (step S48).

Next, the posture identifier 301 matches a posture of the kinetic template held in the memory 108 with the image data and distance data obtained from the sensor 101, and the posture having the greatest degree of resemblance is identified as the posture of the child (step S49). The posture identifier 301 outputs to the activity name identifier 303 the posture information indicating the identified posture status of the child.

Next, the activity name identifier 303 uses the table, defined in the memory 108 ahead of time, that associates the posture of the child with the movement amount of each part and the activity name, and identifies the activity name of the child's activity (step S50). For example, when the posture of the child is identified as a sitting status for at least a predetermined amount of time, and the movement amount of the hand part is detected to be greater than a predetermined movement amount and the movement amounts of the other parts are detected to be less than a predetermined movement amount for at least a predetermined amount of time, the activity name identifier 303 identifies that the child is reading a book or that the child is drawing. For example, the activity name identifier 303 outputs to the response phrase generator 105 the text data assigning the verb "read" to the noun indicating the identified activity name of "book." In the case of English, the activity name identifier 303 may also append the article "a" to the activity name and output the text data "reading a book." In another language, the activity name identifier 303 may instead append some other part of speech, such as a pronoun, to the activity name.

Next, the activity name identifier 303 determines whether the activity name of the child has been identified (step S51). In this example, when the activity name is determined to not be identified (NO in step S51), the process returns to step S41 and the same process as steps S41 to S51 is performed.

However, when the activity name is determined to be identified (YES in step S51), the response phrase generator 105 generates text data in which the text data containing the activity name of the child's activity, received from the activity name identifier 303, is converted to the form of a question in the present progressive tense (step S52). For example, when the text data containing the received activity name of the child's activity is "reading a book," the response phrase generator 105 generates text data in the form of a question saying "Are you reading a book?" and outputs the generated text data to the voice synthesizer 106.

Next, the voice synthesizer 106 converts the text data obtained from the response phrase generator 105 into voice data (step S53). The voice synthesizer 106 outputs the voice data to the speaker 107.

Next, the speaker 107 outputs the voice data received from the voice synthesizer 106 (step S54). Thereby, the topic providing device 100 poses a question to the child.

Next, the microphone 102 obtains voice data indicating the response content of the child in relation to the question content output from the speaker 107 (step S55). The microphone 102 outputs to the voice recognizer 104 the obtained voice data indicating the response content of the child.

Next, the voice recognizer 104 executes the voice recognition process on the voice data output from the microphone 102 and converts the response content of the child contained in the obtained voice data into text data (step S56).

Next, the voice recognizer 104 determines whether the child has responded (step S57). When a degree of reliability for the results of conversion to text data are a predetermined value or less, the voice recognizer 104 rejects the converted text data. The rejection of the text data indicates that the child has not responded to the topic providing device 100. Also, the voice recognizer 104 may determine that the child has not responded in a case where the voice data indicating the response content of the child is not obtained even when a predetermined amount of time has elapsed after the question format voice data containing the activity name is output from the speaker 107. In this example, when the child is determined to have not responded (NO in step S57), the process returns to step S55 and the process of steps S55 to S57 is performed.

However, when the child is determined to have responded (YES in step S57), the activity name determiner 305 determines whether the text data obtained from the voice recognizer 104 contains an affirmative word (step S58). The affirmative word may be, for example, "Yes," "Uh-huh," or "That's right." When the text data contains the affirmative word, the topic providing device 100 can determine that the child is performing the identified activity. Therefore, the activity name determiner 305 outputs the activity name to the activity name logger 306.

In this example, when the text data is determined to not contain the affirmative word (NO in step S58), the activity name determiner 305 determines whether the text data contains a negation (step S59). The negation is, for example, "No," "Nuh-uh," or "I am not."

In this example, when the text data is determined to contain the negation (YES in step S59), the process returns to step S50, and the activity name identifier 303 analyzes each word of the text data and extracts the noun from the text data. The activity name identifier 303 identifies the extracted noun as the activity name of the activity the child is performing. For example, when the text data is "Nuh-uh, I'm drawing a picture," the activity name identifier 303 extracts "drawing a picture," and affixes the verb corresponding to the activity name and outputs text data saying "draw a picture." In addition, when the text data does not contain a noun, as in "No" or "I am not," the activity name identifier 303 cannot identify the activity name, and therefore text data asking about the activity name by saying "What are you doing?" is generated as the identification result, for example. After the activity name is identified, the process beginning at step S50 is performed.

However, when the text data is determined to not contain the negation (NO in step S59), the process ends. Specifically, when the child denies his or her activity, the activity name determiner 305 determines that the child is not active. For example, when the text data contains a word denying "doing something" or "playing," such as "I'm not doing anything" or "I'm not playing," the activity name determiner 305 determines that the child has denied activity and the process ends.

In addition, when the text data is determined to contain an affirmative word (YES in step S58), the activity name logger 306 logs the activity name, the movement amount, the audio level, and the date of the child's activity in the child activity database 204 (step S60). The activity name logger 306 references the audio level and movement amount of each part saved in the memory 108 until a time that is a predetermined amount of time prior to the point in time where the activity name is detected. The activity name logger 306 aligns the scale of the referenced audio level with the scale of the movement amount of each part using a predetermined method. For example, when audio levels and movement amounts of each part are estimated ahead of time, and a maximum value and minimum value are established for each, the minimum value being set to 0.0 and the maximum value being set to 10.0, the audio level or movement amount of each part is fitted to a scale of 0.0 to 10.0 based on a span of the maximum value to the minimum value. A case where the referenced audio level or movement amount of a part is less than the minimum value is defined as 0.0 and a case where the referenced audio level or movement amount of a part is greater than the maximum value is defined as 10.0. The audio level or movement amount of each part fitted to the scale is defined as an average value of the referenced audio level or an average value of the movement amount of each part in a predetermined amount of time, for example.

Accordingly, the activity name of the activity the child is currently performing is identified based on the posture and the movement amount of the child, or based on the noun contained in the extracted voice, and the activity information indicating the identified activity name is associated with the movement amount information and the audio level information, and the associated information is recorded in the child activity database 204. Therefore, a database corresponding to the child can be readily created.

In addition, by using the child activity database 204 in which the activity information indicating the activity name is associated with the movement amount information and the audio level information, a topic corresponding to the details of the child's activity can be provided, and a topic that is easy for the child to discuss can be provided.

Third Embodiment

In a third embodiment, an example where the topic providing device 100 is installed in a robot 400 is described with reference to FIGS. 16 and 17. Moreover, in the following description, in order to simplify the description, identical reference numerals are assigned to configurations similar to those in the first and second embodiments and a description thereof is omitted.

Figure 16:
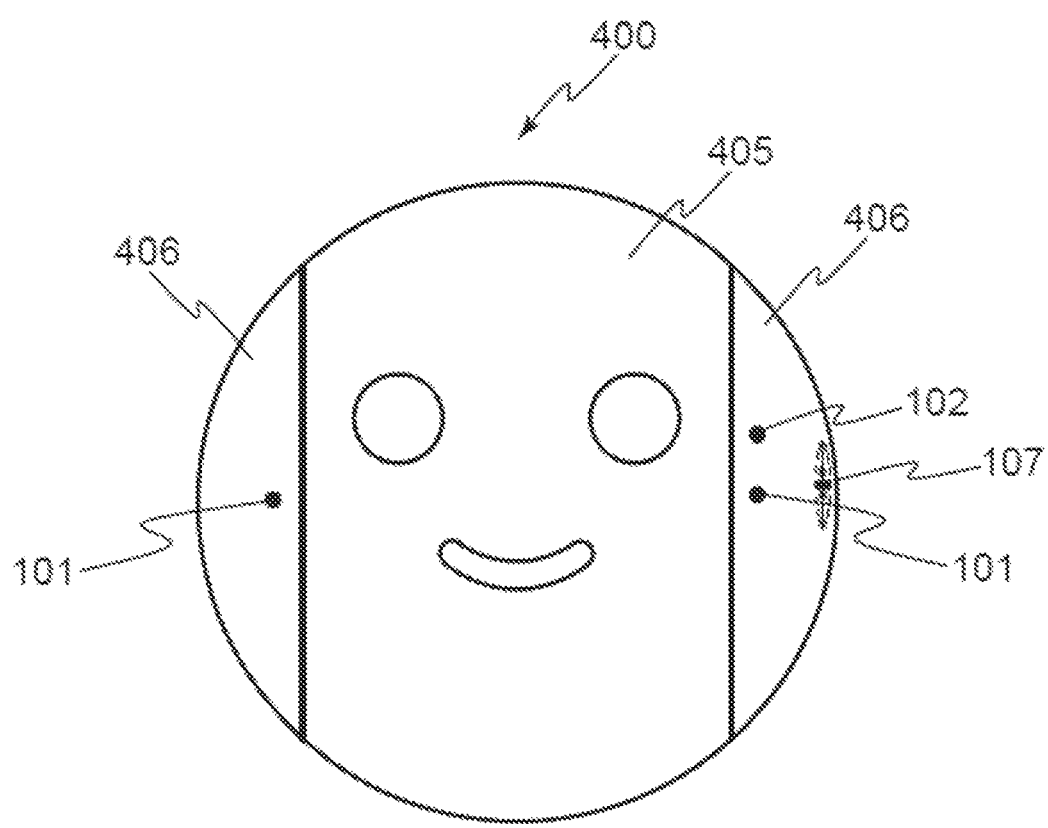
FIG. 16 is an exterior view of a robot according to a third embodiment.

FIG. 16 is an exterior view of the robot 400 according to the third embodiment. FIG. 17 is a block diagram illustrating a configuration of the robot 400 according to the third embodiment.

As shown in FIG. 16, the robot 400 includes a spherical band-shaped main casing 405 and spherical caps 406, the main casing 405 and the spherical caps 406 configuring an overall spherical body. In other words, the robot 400 has a spherical shape. In addition, as shown in FIG. 16, the robot 400 includes the sensor 101, the microphone 102, and the speaker 107 in the spherical caps 406. As shown in FIG. 17, the robot 400 also includes a control circuit 401. The sensor 101 is a stereo camera using two cameras, and therefore obtains image data and distance data of a surrounding environment. The control circuit 401 controls various operations of the robot 400. A detailed description of the control circuit 401 is given below with reference to FIG. 17. In the third embodiment, the robot 400 configures an overall spherical body, but the robot 400 is not limited to this and may have any configuration provided with at least a displacement mechanism.

Figure 17:
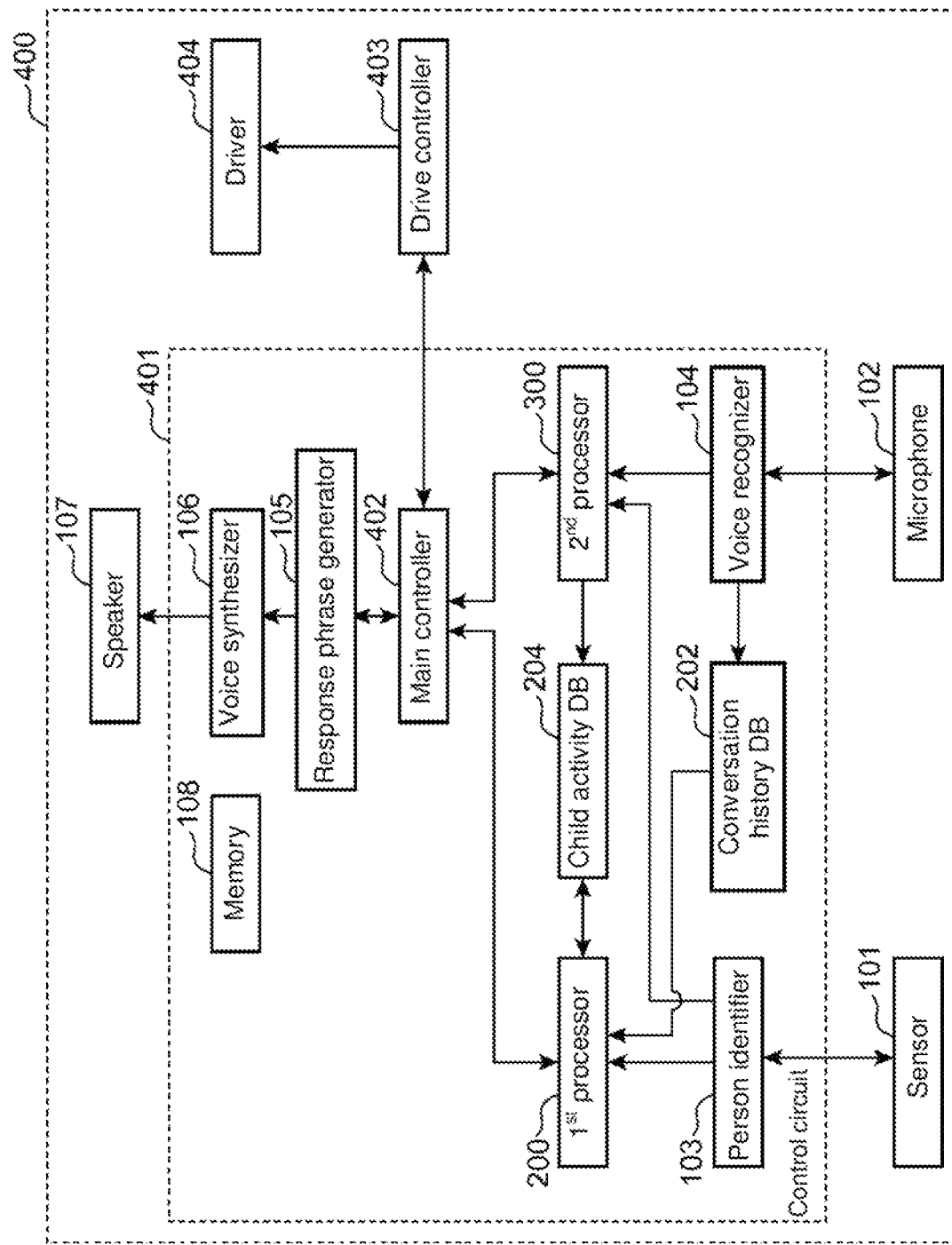
FIG. 17 is a block diagram illustrating a configuration of the robot according to the third embodiment.

The robot 400 depicted in FIG. 17 includes the sensor 101, the microphone 102, the speaker 107, the control circuit 401, a drive controller 403, and a driver 404.

The control circuit 401 includes the person identifier 103, the voice recognizer 104, the conversation history database 202, the child activity database 204, the first processor 200, the second processor 300, a main controller 402, the response phrase generator 105, the voice synthesizer 106, and the memory 108.

As in the second embodiment, the sensor 101 outputs the image data and the distance data to the person identifier 103.

As in the first and second embodiments, the microphone 102 outputs the voice data to the voice recognizer 104.

The person identifier 103 performs the same process as in the first embodiment and outputs the person identification results to the first processor 200. In addition, the person identifier 103 performs the same process as in the second embodiment and outputs the person (child) identification results to the second processor 300.

The voice recognizer 104 performs the same process as in the first embodiment and outputs the text data or the like to the conversation history database 202. In addition, the voice recognizer 104 performs the same process as in the second embodiment and outputs the text data or the like to the second processor 300.

The conversation history database 202 is used in the same way as in the first embodiment. The conversation history database 202 may also exist in the cloud.

The child activity database 204 is used in the same way as in the first and second embodiments. The child activity database 204 may also exist in the cloud.

When the first processor 200 performs the same process as in the first embodiment, and the extraction of the topic to be provided to the user is complete, the first processor 200 outputs to the main controller 402 information related to the provided topic.

When the second processor 300 performs the same process as in the second embodiment, and the identification of the activity name of the child's activity is complete, the second processor 300 outputs the identification result to the main controller 402.

The main controller 402 governs behavior of the robot 400. By fulfilling a predetermined condition, the main controller 402 transmits a command to the drive controller 403. Thereby, the robot 400 is displaced. The main controller 402 obtains from the first processor 200 information relating to the provided topic. When the information relating to the provided topic is obtained, the main controller 402 outputs to the response phrase generator 105 the information relating to the provided topic.

The main controller 402 obtains the identification result for the activity name of the child's activity from the second processor 300. When the identification result of the activity name of the child's activity is obtained, the main controller 402 outputs the identification result to the response phrase generator 105.

In accordance with the command transmitted from the main controller 402, the drive controller 403 actuates the driver 404 of the robot 400. When the command transmitted from the main controller 402 is a command issuing an instruction to search for the user, for example, the robot 400 turns so as to survey the surrounding area.

By rotating the spherical band-shaped main casing 405, the driver 404 causes the robot 400 to advance or retreat. In addition, by changing a center of gravity position on an interior of the main casing 405, for example using an integrated pendulum, the driver 404 is capable of spinning movement.

The response phrase generator 105 performs the same process as in the first and second embodiments, generates the text data, and outputs the text data to the voice synthesizer 106.

The voice synthesizer 106 performs the same process as in the first and second embodiments and converts the text data to voice data. The speaker 107 outputs the voice data.

In the present disclosure, all or a portion of a unit, device, member, or part, or all or a portion of a functional block in a block diagram shown in the drawings may be executed by a semiconductor device, semiconductor integrated circuit (IC), or one or a plurality of electronic circuits that include large scale integration (LSI). The LSI or IC may be integrated on a single chip, or may be configured by an assembly of a plurality of chips. For example, a functional block other than a memory element may be integrated on a single chip. The terms LSI and IC are used in this example, but terminology may differ depending on a degree of integration and may also include terms such as system LSI, very large scale integration (VLSI), or ultra large scale integration (ULSI). A field programmable gate array (FPGA) programmed after manufacture of the LSI, or a reconfigurable logic device capable of reconfiguring a connection relationship within an LSI or of setting up circuit partitions within an LSI can also be used for the same purpose.

Moreover, a function or operation of all or a portion of a unit, device, member, or part can be executed by a software process. In such a case, the software is written to a non-transitory storage medium such as one or a plurality of ROMs, an optical disk, or a hard disk drive, and when the software is executed by a processor, the function specified by the software is executed by the processor and peripheral equipment. The system or device may also include one or a plurality of non-transitory storage mediums to which the software is written, a processor, and a required hardware device (for example, an interface).

INDUSTRIAL APPLICABILITY

A voice interaction device, voice interaction method, voice interaction program, and robot according to the present disclosure can provide a topic corresponding to details of a child's activity, can provide a topic that is easy for the child to discuss, and are useful as a voice interaction device, voice interaction method, voice interaction program, and robot performing voice interaction with a plurality of users.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A device performing voice interaction with a plurality of users, the device comprising:
   a sensor obtaining image data of an area around the device;
   a microphone obtaining audio of the area around the device;
   a speaker;
   a processor; and
   a non-transitory memory storing thereon a computer program, which when executed by the processor, causes the processor to perform operations including
   storing a plurality of image data corresponding to the plurality of users, the plurality of users including an adult and a child;
   identifying a person contained in the obtained image data based on the obtained image data and the stored plurality of image data, and outputting user information indicating the identified person;
   extracting a voice from the obtained audio, extracting a feature value of the voice and text data corresponding to the voice, and associating the text data with the feature value and recording the associated text data and feature value in a first database;
   first determining, based on the user information and the first database, whether the adult and the child are conversing, and determining that the adult and the child are conversing when the adult and the child are the identified persons and the feature value contains a plurality of mutually dissimilar feature values;
   second determining, based on the first database, whether there is a need to provide a new topic to the adult and the child when the adult and the child are determined to be conversing, and determining that there is a need to provide a new topic to the adult and the child when a first key phrase is contained in the text data indicating the conversation between the adult and the child during a current predetermined period of time;
   extracting at least one candidate topic based on the first database and a second database when providing the topic is determined to be necessary, the second database storing at least one activity name indicating an activity the child was engaged in for a first predetermined period of time, which is earlier than the current predetermined period of time, the at least one candidate topic corresponding to the at least one activity name in the second database and not corresponding to the at least one activity name included in the text data indicating the conversation between the adult and the child during the current predetermined period of time recorded in the first database;
   selecting from the at least one candidate topic one topic to provide to the adult and the child;
   generating voice data containing the one topic; and
   outputting the generated voice data via the speaker.

2. The device according to claim 1, wherein
the second database further stores movement amount information indicating an amount of movement corresponding to the activity name, audio level information indicating an audio level corresponding to the activity name, and date information indicating a date corresponding to the activity name,
in the extracting, specifying the newest activity name based on the second database and extracting, as the at least one candidate topic, at least one second activity name different from the newest activity name and the at least one activity name included in the text data, and
in the selecting, selecting, as the one topic, a third activity name from the at least one second activity name based on a first movement amount corresponding to the newest activity name, a first audio level corresponding to the newest activity name, a second movement amount corresponding to the at least one second activity name among the activity names, and a second audio level corresponding to the at least one second activity name.

3. The device according to claim 2, wherein
in the selecting, selecting, as the third activity name, the second activity name having the largest sum calculated according to the following formula:

$$(A-B)^2+(C-D)^2$$

where A represents the first movement amount, B represents the second movement amount, C represents the first audio level, and D represents the second audio level.

4. The device according to claim 2, wherein
in the extracting, extracting, as the at least one candidate topic, at least one second activity name different from the newest activity name and the at least one activity name included in the text data, the at least one second activity name being recorded in a second predetermined period of time.

5. The device according to claim 2, wherein
the movement amount information is a value obtained by multiplying a first coefficient by the movement amount, and
the audio level information is a value obtained by multiplying a second coefficient by the audio level.

6. The device according to claim 2, wherein
in the generating, based on the second database, when a third movement amount corresponding to the third activity name is equal to or greater than a first threshold value generating the voice data containing a second key phrase and, based on the second database, when the third movement amount corresponding to the third activity name is less than the first threshold value, generating the voice data containing a third key phrase.

7. The device according to claim 6,
wherein the second key phrase and the third key phrase contain phrasing providing feedback on the child's engagement level in the third activity name, and
a meaning indicated by the second key phrase is the opposite of a meaning indicated by the third key phrase.

8. The device according to claim 2, wherein
in the generating based on the second database, when a third audio level corresponding to the third activity name is equal to or greater than a first threshold value, generating the voice data containing a second key phrase and, based on the second database, when the third audio level corresponding to the third activity name is less than the first threshold value, generating the voice data containing a third key phrase.

9. The device according to claim 8, wherein
the second key phrase and the third key phrase contain phrasing providing feedback on the child's engagement level in the third activity name, and
a meaning indicated by the second key phrase is the opposite of a meaning indicated by the third key phrase.

10. The device according to claim 1, wherein
the feature value contains a voice-print of a speaker from whom a voice issues.

11. The device according to claim 1, wherein
the first key phrase includes wording that indicates the topic.

12. A robot comprising:
the device according to claim 1;
a casing incorporating the device; and
a displacement mechanism displacing the casing.

13. A method in a device performing voice interaction with a plurality of users, wherein the device includes a processor and a non-transitory memory, the method comprising:

obtaining image data of an area around the device via a sensor;
obtaining audio of the area around the device via a microphone;
identifying a person contained in the obtained image data based on the obtained image data and a plurality of image data stored in a memory storing a plurality of image data corresponding to the plurality of users, and outputting user information indicating the identified person, the plurality of users including an adult and a child;
extracting a voice from the obtained audio, extracting a feature value of the voice and text data corresponding to the voice, and associating the text data with the feature value and recording the associated text data and feature value in a first database;
first determining, based on the user information and the first database, whether the adult and the child are conversing, and when the adult and the child are the identified persons and the feature value contains a plurality of mutually dissimilar feature values, determining that the adult and the child are conversing;
second determining, based on the first database, whether there is a need to provide a new topic to the adult and the child when the adult and the child are determined to be conversing, and determining that there is a need to provide a new topic to the adult and the child when a first key phrase is contained in the text data indicating the conversation between the adult and the child during a current predetermined period of time;
extracting at least one candidate topic based on the first database and a second database when providing the topic is determined to be necessary, the second database storing at least one activity name indicating an activity the child was engaged in for a first predetermined period of time, which is earlier than the current predetermined period of time, the at least one candidate topic corresponding to the at least one activity name in the second database and not corresponding to the at least one activity name included in the text data indicating the conversation between the adult and the child during the current predetermined period of time recorded in the first database;
selecting from the at least one candidate topic one topic to provide to the adult and the child;
generating voice data containing the one topic; and
outputting the generated voice data via a speaker.

* * * * *